United States Patent
Mahajan et al.

(10) Patent No.: US 10,705,830 B2
(45) Date of Patent: *Jul. 7, 2020

(54) MANAGING HOSTS OF A PRE-CONFIGURED HYPER-CONVERGED COMPUTING DEVICE

(71) Applicant: VMware, Inc., Palo Alto, CA (US)

(72) Inventors: Arun Mahajan, Palo Alto, CA (US); Chitrank Seshadri, Saratoga, CA (US); Atanu Panda, Palo Alto, CA (US); Sudipto Mukhopadhyay, Pleasanton, CA (US); Mao Ye, San Jose, CA (US); Benjamin Davini, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 15/888,464

(22) Filed: Feb. 5, 2018

(65) Prior Publication Data

US 2019/0026140 A1 Jan. 24, 2019

Related U.S. Application Data

(60) Provisional application No. 62/534,890, filed on Jul. 20, 2017.

(51) Int. Cl.
*G06F 8/71* (2018.01)
*G06F 9/455* (2018.01)
(Continued)

(52) U.S. Cl.
CPC ............... *G06F 8/71* (2013.01); *G06F 8/65* (2013.01); *G06F 8/70* (2013.01); *G06F 9/45558* (2013.01);
(Continued)

(58) Field of Classification Search
None
See application file for complete search history.

(56) References Cited

U.S. PATENT DOCUMENTS 6,370,249 B1   4/2002   Van
8,245,579 B2   8/2012   Wilner et al.
(Continued)

OTHER PUBLICATIONS

"LinuxQuestions, "Which is safer? Only ssh +scp for 2 users? Or ssh (1 user)+vsftpd (1 virtual user)," Sep. 18, 2011,", last retrieved from https://www.linuxquestions.org/questions/linux-security-4/which-is-safer-only-ssh-scp-for-2-users-or-ssh-1-user-vsftpd-1-virtual-user-903695/ (Year: 2011)., 2 pgs.
(Continued)

*Primary Examiner* — Qing Yuan Wu

(57) ABSTRACT

In a computer-implemented method for managing hosts of a pre-configured hyper-converged computing device, a pre-configured hyper-converged computing device comprising a plurality of hosts is managed, where the plurality of hosts is allocable to workload domains, where unallocated hosts of the plurality of hosts is maintained within a pool of unallocated hosts, and where the plurality of hosts each have an operating system version. An unallocated host of the pool of unallocated hosts is determined as having an operating system version that is outside of a range of supported operating system versions. The operating system version of the unallocated host is updated to an operating system version within the range of supported operating system versions.

21 Claims, 21 Drawing Sheets

(51) Int. Cl.
*G06F 8/65* (2018.01)
*G06F 8/70* (2018.01)
*G06F 9/50* (2006.01)

(52) U.S. Cl.
CPC .............. *G06F 9/50* (2013.01); *G06F 9/5055* (2013.01); *G06F 9/455* (2013.01); *G06F 9/45533* (2013.01)

(56) References Cited

U.S. PATENT DOCUMENTS

| | | | |
|---|---|---|---|
| 8,775,577 | B1 | 7/2014 | Alford et al. |
| 8,843,929 | B1* | 9/2014 | Oppenheimer ....... G06F 9/5044 718/102 |
| 9,294,284 | B1 | 3/2016 | Mao |
| 9,819,496 | B2 | 11/2017 | Lin et al. |
| 9,881,160 | B2 | 1/2018 | Batke et al. |
| 9,904,527 | B1 | 2/2018 | Miller et al. |
| 2002/0199180 | A1 | 12/2002 | Donaldson et al. |
| 2006/0190766 | A1 | 8/2006 | Adler et al. |
| 2008/0016357 | A1 | 1/2008 | Suarez |
| 2009/0217362 | A1 | 8/2009 | Nanda et al. |
| 2011/0296408 | A1 | 12/2011 | Lo et al. |
| 2012/0222025 | A1* | 8/2012 | Pandit ..................... G06F 8/658 717/170 |
| 2012/0284716 | A1 | 11/2012 | Martins et al. |
| 2012/0324446 | A1 | 12/2012 | Fries et al. |
| 2013/0117554 | A1 | 5/2013 | Ylonen |
| 2013/0152047 | A1 | 6/2013 | Moorthi et al. |
| 2014/0143542 | A1 | 5/2014 | Chang |
| 2014/0365765 | A1 | 12/2014 | Oswalt |
| 2015/0120928 | A1 | 4/2015 | Gummaraju et al. |
| 2015/0186175 | A1 | 7/2015 | Van Der Walt et al. |
| 2015/0254451 | A1 | 9/2015 | Doane et al. |
| 2015/0324587 | A1 | 11/2015 | Batke et al. |
| 2016/0170781 | A1 | 6/2016 | Liguori et al. |
| 2016/0203313 | A1 | 7/2016 | El-Moussa et al. |
| 2016/0224785 | A1 | 8/2016 | Wagner et al. |
| 2017/0068530 | A1 | 3/2017 | Berrange |
| 2017/0222981 | A1 | 8/2017 | Srivastav et al. |
| 2017/0351862 | A1 | 12/2017 | Mohinder et al. |
| 2017/0371683 | A1* | 12/2017 | Devireddy ................ G06F 8/63 |
| 2019/0026140 | A1 | 1/2019 | Mahajan et al. |
| 2019/0026141 | A1 | 1/2019 | Mahajan et al. |
| 2019/0026162 | A1 | 1/2019 | Mahajan et al. |

OTHER PUBLICATIONS

Ellingwood, "How to Add and Delete Users on an Ubuntu 14.04 VPS," DigitalOcean, Apr. 22, 2014, last retrieved from https://www.digitalocean.com/community/tutorials/how-to-add-and-delete-users-on-an-ubuntu-14-04-vps on Apr. 30, 2018 (Year: 2014)., 6 pgs.

* cited by examiner

MANAGING HOSTS OF A PRE-CONFIGURED HYPER-CONVERGED COMPUTING DEVICE

RELATED APPLICATION

This application claims priority to the provisional patent application having Application No. 62/534,890, entitled "MANAGING HOSTS OF A PRE-CONFIGURED HYPER-CONVERGED COMPUTING DEVICE," with filing date Jul. 20, 2017, by Mahajan et al., which is herein incorporated by reference in its entirety.

BACKGROUND

In conventional virtual computing environments, creating and managing hosts (e.g., ESX hosts) and virtual machines may be complex and cumbersome. Oftentimes, a user, such as an IT administrator, requires a high level and complex skill set to effectively configure a new host to join the virtual computing environment. Moreover, management of workloads and workload domains, including allocation of hosts and maintaining consistency within hosts of particular workload domains, is often made difficult due to the distributed nature of conventional virtual computing environments.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION OF CERTAIN EMBODIMENTS

Figure 1:
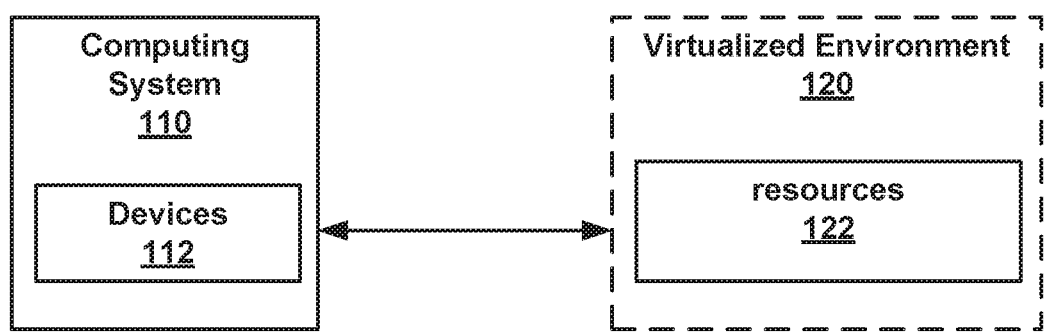
FIG. 1 depicts a block diagram of a virtual computing environment, according to various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "provisioning," "managing," "maintaining," "selecting," "allocating," "updating," "retrieving," "applying," "reimaging," "releasing," "determining," "receiving," "adding," "comparing," "scanning," or the like, refer to the actions and processes of an electronic computing device or system such as: a host processor, a processor, a memory, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the performance of computer systems such as pre-configured hyper-converged computing devices by improving the management and allocation of hosts to workload domains. Workload domains are logical units of computing resources that are used for running workloads and hosting computing services. Hosts of pre-configured hyper-converged computing devices are allocated to workload domains, where hosts within a workload domain operate under the same operating system version.

Embodiments described herein provide methods for provisioning a host to a workload domain of a pre-configured hyper-converged computing device. A pre-configured hyper-converged computing device comprising a plurality of hosts is managed, where the plurality of hosts is allocable to workload domains, and where allocated hosts of a particular workload domain are of a same operating system version. A pool of unallocated hosts is maintained within the pre-configured hyper-converged computing device, where the unallocated hosts of the pool have operating system versions within a range of supported operating system versions. Unallocated hosts from the pool of unallocated hosts can be allocated to workload domains based on the operating system version of the unallocated hosts. In one embodiment, responsive to receiving a command to add a host to the particular workload domain, a host from the pool of unallocated hosts that has the same operating system version as the allocated hosts of the particular workload domain is selected for allocation to the particular workload domain. In another embodiment, responsive to receiving a command to add a host to the particular workload domain, and where no hosts of the pool of unallocated hosts has the same operating system version as the allocated hosts of the particular workload domain, a host is selected for updating to the same operating system version as the allocated hosts of the particular workload domain and then allocated to the particular workload domain. The described embodiments provide for allocation of unallocated hosts to workload domains that conform to the operating system version of the available workload domains.

Embodiments described herein provide methods for managing hosts of a pre-configured hyper-converged computing device. A pre-configured hyper-converged computing device comprising a plurality of hosts is managed, where the plurality of hosts is allocable to workload domains, where unallocated hosts of the plurality of hosts is maintained within a pool of unallocated hosts, and where the plurality of hosts each have an operating system version. An unallocated host of the pool of unallocated hosts is determined as having an operating system version that is outside of a range of supported operating system versions. The operating system version of the unallocated host is updated to an operating system version within the range of supported operating system versions. In one embodiment, the unallocated host is received responsive to a host being removed from a workload domain. In another embodiment, the unallocated host is received responsive to new hosts being added to the pre-configured hyper-converged computing device. The described embodiments provide for maintaining a pool of unallocated hosts that conform to the operating system versions supported by the pre-configured hyper-converged computing device.

Embodiments described herein provide methods for maintaining unallocated hosts of a pre-configured hyper-converged computing device at a baseline operating system version. A plurality of hosts of a pre-configured hyper-converged computing device is managed, where the plurality of hosts are allocable to workload domains, where the plurality of hosts each have an operating system version within a range of supported operating system versions, where unallocated hosts of the plurality of hosts are maintained within a pool of unallocated hosts, and where the unallocated hosts of the pool of unallocated hosts have a baseline operating system version of the range of supported operating system versions. A new unallocated host is received at the pre-configured hyper-converged computing device for inclusion to the pool of unallocated hosts. An operating system version of the new unallocated host is determined. Provided the new unallocated host has an operating system version other than the baseline operating system version, the new unallocated host is updated to the baseline operating system version. The new unallocated host is released to the pool of unallocated hosts for allocation to a workload domain. In one embodiment, a command to add an unallocated host of the pool of unallocated hosts to a particular workload domain is received. An operating system version of hosts of the particular workload domain is determined. The operating system version of the unallocated host is updated to the operating system version of allocated hosts of the of the particular workload domain. The unallocated host is then allocated to the particular workload domain. The described embodiments provide for maintaining a pool of unallocated hosts that can be updated on demand to the operating system version of the particular workload domain.

Embodiments of a Virtual Computing Environment

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Example Host Computer System

Figure 2:
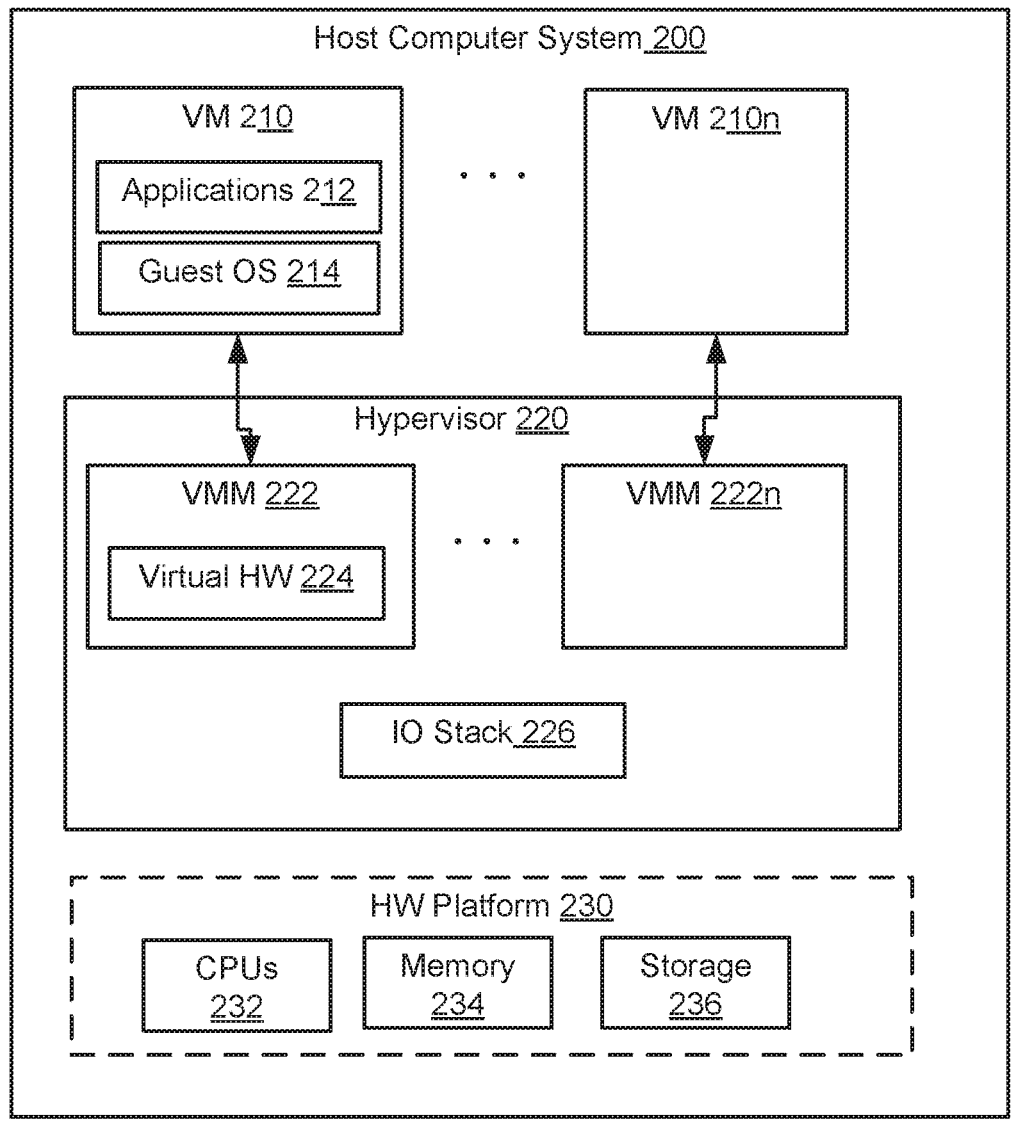
FIG. 2 depicts a block diagram of a host computing system, according to various embodiments.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. Example operating systems include, without limitation, Windows operating systems (e.g., Windows 7, Windows 8, Windows 10, or Windows Server 2012 R2), UNIX operating systems (e.g., Mac OS X server), and Linux operating systems. Moreover, it should be appreciated that operating systems are updated over time to different versions of the operating system (e.g., to provide improved functionality and/or to address security concerns). In accordance with various embodiments, operating system versions can refer to a particular release of an operating system and/or a particular build of an operating system. For example, a security patch applied to an operating system may refer to a new version of the operating system.

IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Examples of an Appliance

Figure 3:
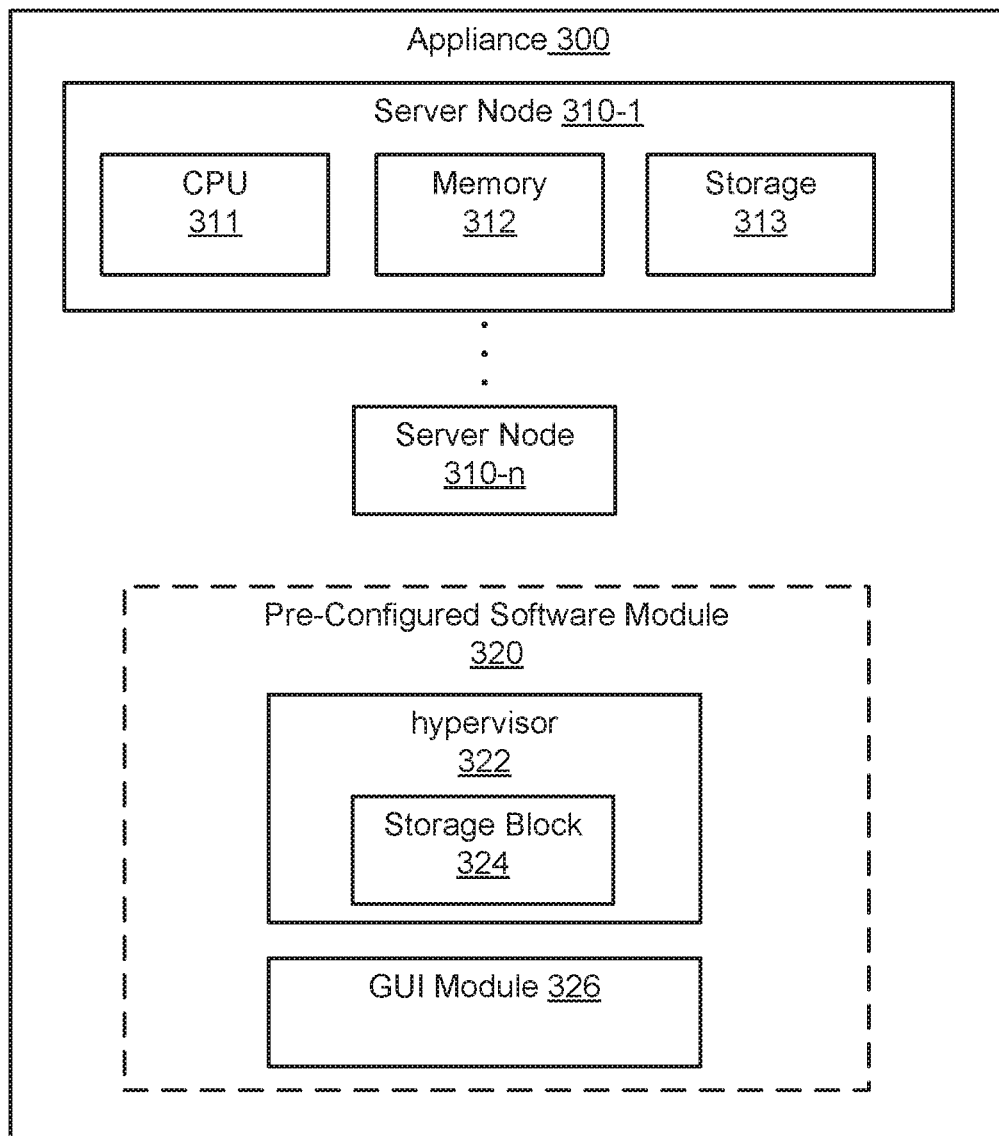
FIG. 3 depicts a block diagram of an appliance, according to various embodiments.

FIG. 3 depicts an embodiment of appliance 300. Appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one server node. For example, server nodes 310-1 through server node 310-n. Server node 310-1 includes a central processing unit (CPU) 311, memory 312, and storage 313. It should be appreciated that other server nodes (i.e., server node 310-n) each include a CPU, memory, and storage similar to server node 310-n.

Appliance 300 is scalable. That is appliance can be scaled to include more than one server node. For example, appliance 300 can initially have a single server node. However, additional server nodes may be included in appliance 300.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Moreover, each server node may be considered a server or host computing system. That is, each server node is able to independently host a number of virtual machines. For example, server node 310-1 is able to host a first set of virtual machines, while other server nodes are each able to independently host other sets of virtual machines, respectively.

The server nodes are independent of one another, and are not required to share any functionality with one another. Appliance 300 does not include a backplane. As such, the server nodes are isolated from one another and therefore independent of one another.

CPU 311 may be, but is not limited to, a dual socket CPU (e.g., Intel Xeon™ CPUs, 4-core to 6-core).

Memory 312 may be, but is not limited to, 128 gigabytes (GB).

Storage may be, but is not limited to, three drive slots per node. Such as a solid state drive (SSD) (e.g., an SSD up to 800 GB), and two hard disk drives (HDD) (e.g., HDDs up to 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2U/4Node appliance. That is, appliance 300 is two rack units in height and includes four server nodes (e.g., server nodes 310-1 through 310-n).

The size of a piece of rack-mounted equipment is described as a number in "U" or "RU" (rack unit). One rack unit is often referred to as "1U", 2 rack units as "2U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4U/4Node appliance. That is, appliance 300 is four rack units in height and includes 4 server nodes (e.g., server nodes 310-1 through 310-n).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes pre-configured software module 320.

It should be appreciated that the software installed on appliance 300 (e.g., software module 320) is stored in a storage device. In various embodiments, the software may be installed in a single server node or may be distributed in various server nodes. In another embodiment, the software may be stored in a storage device within appliance 300 but is outside of the server nodes.

During operation of the appliance, the software may be executed by one or more CPUs in a single server node or the execution may be distributed amongst various CPUs in various server nodes.

Software module 320 includes, among other things, hypervisor 322. As described above, a hypervisor is installed on top of hardware platform (e.g., CPU, memory and storage) and supports a virtual machine execution space within which one or more virtual machines (VMs) may be concurrently instantiated and executed.

In various embodiments, hypervisor 322 is VMware ESX™ hypervisor or a VMware ESXi™ hypervisor. It is noted that "ESX" is derived from the term "Elastic Sky X" coined by VMware™.

It should be appreciated that software module 320, in one embodiment, includes a suite of software tools for cloud computing (e.g., VMware vSphere™ VCenter™) that utilizes various components such as a VMware ESX/ESXi hypervisor.

Software module 320 includes storage block 324. Storage block 324 is a logical partition of storage (e.g., storage 313) in appliance 300. In other words, storage block 324 is virtual storage. In one embodiment, storage block 314 is a virtual storage area network (VSAN). As a result, the VSAN allows traffic to be isolated within specific portions of a storage area network.

Storage block 324 is imbedded or integral with hypervisor 322. In other words, the data path for storage is in the hypervisor layer.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to creating and managing appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

Figure 4:
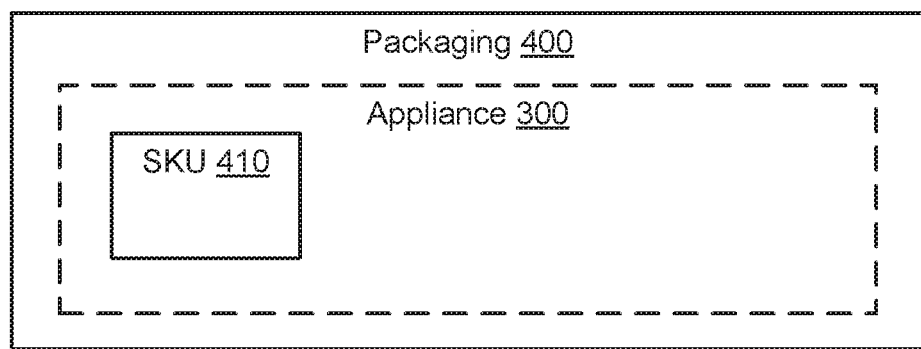
FIG. 4 depicts a block diagram of a side-view of an appliance offered for sale, according to various embodiments.

FIG. 4 depicts an embodiment of a side-view of an appliance offered for sale. In one embodiment, appliance 300 is offered for sale as a single stock keeping unit (SKU). For example, appliance 300 is disposed in packaging 400 and SKU 410 is on packaging 400. Accordingly, appliance 300 is offered for sale as a single SKU.

More specifically, appliance 300, as described herein, is pre-configured with the requisite hardware and software for employing a virtualization infrastructure. Therefore, subsequent the purchase of appliance 300 as a single SKU, appliance 300 is not required to include any additional hardware and/or software to support and manage a virtualization infrastructure.

Upon powering on appliance 300 for the first time, a single EULA is displayed to an end-user. Because software module 320 is proprietary to a single entity (e.g., VMware™), only a single EULA, provided by the single entity, is displayed to the purchasing end-user. More specifically, at least hypervisor 322 (e.g., ESX/ESXi hypervisor) and storage block 324 (e.g., VSAN) are proprietary to a single entity (e.g., VMware™). Therefore, only a single EULA pertaining to hypervisor 322 and storage block 324 is displayed and provided to an end-user.

Upon acceptance of the EULA, appliance 300 is enabled to operate and manage a virtualization infrastructure, and deploy virtual machines in the virtualization infrastructure.

It should be appreciated that upon first powering on appliance 300 and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Examples of Virtualization Infrastructures

Figure 5:
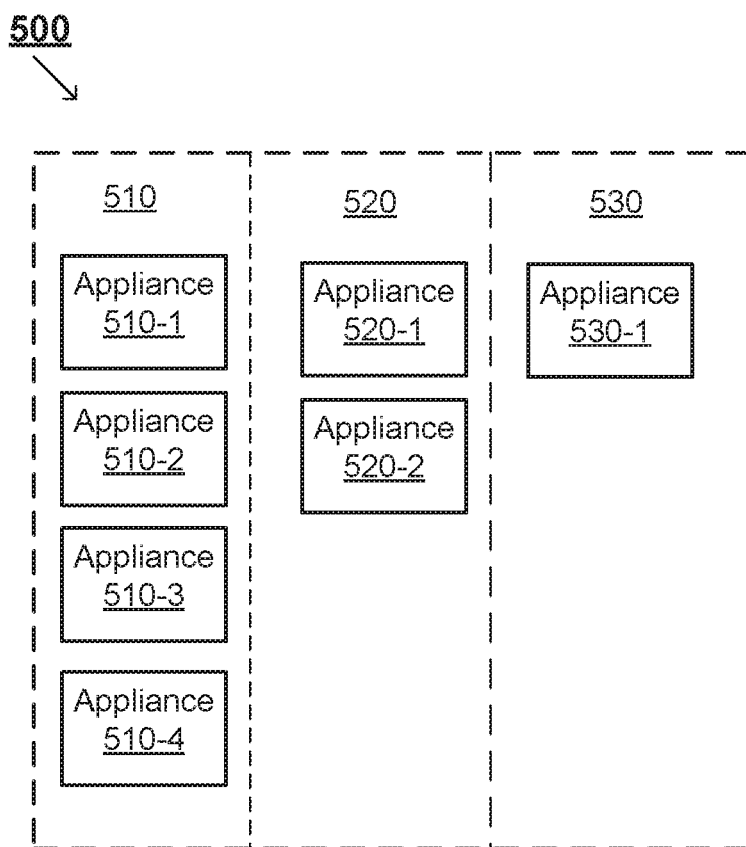
FIG. 5 depicts a block diagram of a virtualization infrastructure, according to various embodiments.

FIG. 5 depicts an embodiment of various appliances supporting virtualization infrastructure 500.

In one embodiment, appliances may be grouped together to increase the functionality of creating and managing a virtualization infrastructure. For example, appliance 510-1 was initially utilized to deploy a plurality of virtual machines, at location 510. However, additional virtual machines were desired but appliance 510-1, alone, was not able to meet the demand for the desired additional virtual machines. As such, additional appliances 510-2, 510-3, and 510-4 were purchased and grouped together to meet the demand of the additional virtual machines. In particular, the cluster of appliances which are communicatively coupled together, act as a single platform for managing the virtualization infrastructure and deploying virtual machines.

Similarly, appliance 520-1 was initially utilized to deploy a plurality of virtual machines, at location 520. However, additional virtual machines were desired but appliance 520-1, alone, was not able to meet the demand for the desired additional virtual machines. As such, additional appliance 520-2 was purchased and grouped together with appliance 520-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or clusters of appliances may be located at various locations. For example, a first cluster of appliances may be located at a main office of an enterprise, while a second cluster of appliances are located at a remote office/branch office (ROBO).

In another example, virtualization infrastructure 500 is a virtualization infrastructure of a large enterprise having various building and infrastructure at various geo-locations. In such an example, information technology (IT) is located at a first location (e.g., location 510), an engineering team is located at a second location (e.g., location 520) and sales team is located at location 530.

Accordingly, appliances 510-1 through 510-4 may be grouped together at a first location 510 to support the demand for virtual machines of the IT team, appliances 510-1 and 510-2 are grouped together at location 520 to support the demand of virtual machines for the engineering team, and appliance 530-1 is located at location 530 to support the demand of virtual machines for the sales team.

As will be described in further detail below, GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

Example Virtual Environment

Figure 6:
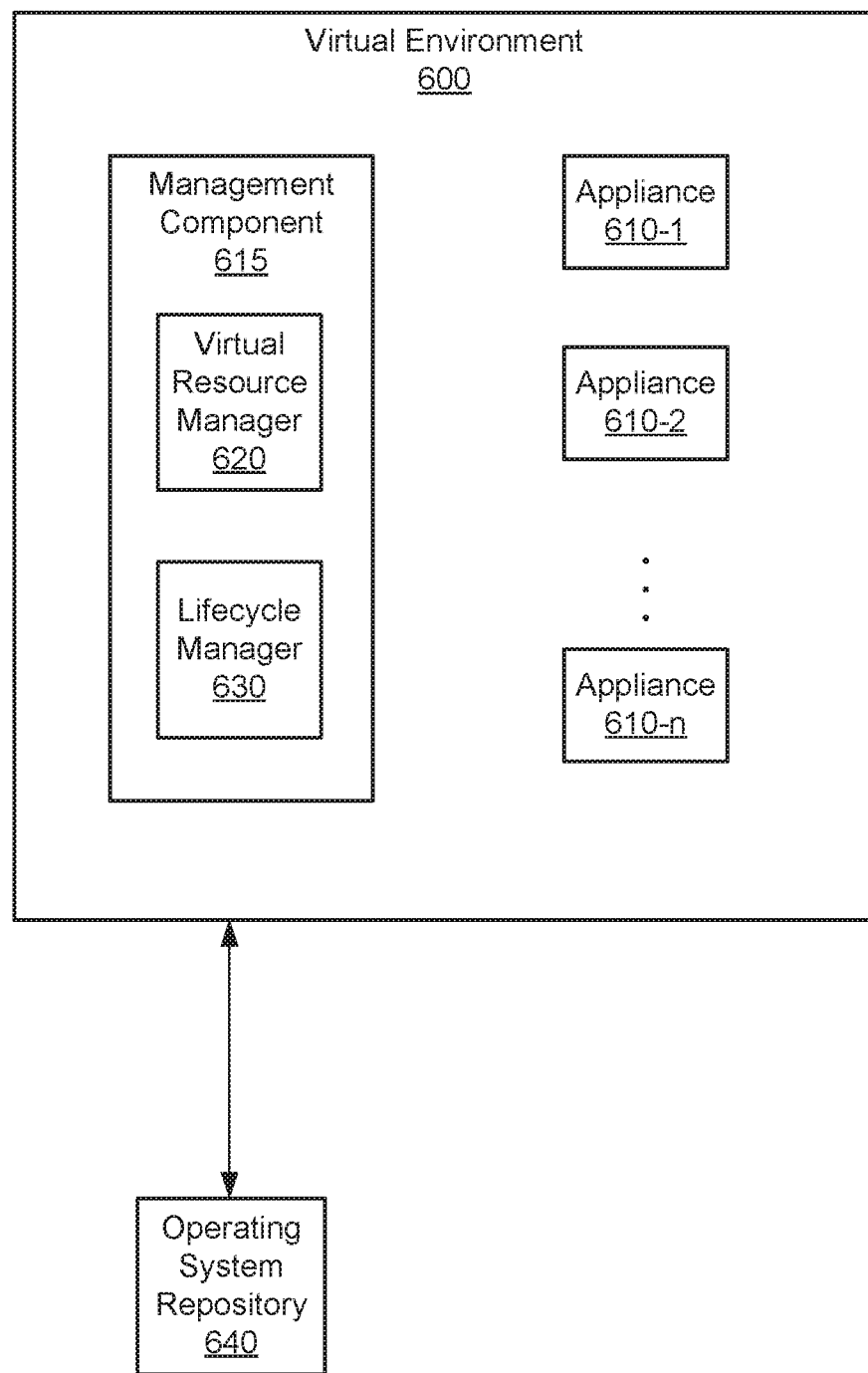
FIG. 6 illustrates an example virtual environment, in accordance with an embodiment.

FIG. 6 illustrates an example virtual environment 600 (e.g., a cloud environment) in accordance with an embodiment. Virtual environment 600 may include one or more appliances. Virtual environment 600, in one embodiment, includes appliance cluster 610 that includes appliances 610-1 through 610-n (e.g., a plurality of appliance 300 of FIG. 3). Appliances 610-1 through 610-n are communicatively coupled and act as a platform for managing the virtualization infrastructure and deploying virtual machines. VMware Cloud Foundation (VCF) is an example virtual environment 600.

Virtual environment 600 also includes management component 615 that includes virtual resource manager 620 and lifecycle manager 630. It should be appreciated that management component 615 may be implemented in a computing device, either virtual or physical, within virtual environment 600, and is communicatively coupled to appliances 610-1 through 610-n. Management component 615 may be implemented within one or more of appliances 610-1 through 610-n.

In various embodiments, virtual resource manager 620 is for managing allocation of hosts of appliances 610-1 through 610-n. For example, virtual resource manager 620 operates to make resources of appliances 610-1 through 610-n (e.g., storage hardware, computing hardware, and networking hardware) work together to achieve installation/operation and optimizing the resources for improved performance within virtual environment 600. Virtual resource manager 620 translates application requirements to physical infrastructure requirements. In accordance with various described embodiments, workload domains are mapped to a management cluster deployment (e.g., a vSphere cluster of VMware, Inc.) in a deployment (e.g., a rack deployment). Moreover, as additional appliances are added to virtual environment 600, cross-rack clusters become an option. Examples disclosed herein facilitate improved workload domain configuration and management.

As utilized herein, a workload domain is an abstraction that can be applied to a number of different types of compute workloads. This allows the administrator to deploy capacity for specific workload types using a policy-driven approach on top of physical resources. In various embodiments, a workload domain has a set of policies that are configurable by the user during the deployment process. For example, a workload domain can be configured according to capacity required (e.g., host count and storage requirements), availability required, performance required, and networks required.

In some embodiments, a workload domain is a grouping of hosts of appliances 610-1 through 610-n. It should be appreciated that a workload domain can include any number of hosts, and that hosts of a workload domain con be distributed across any number of appliances. In accordance with various embodiments, hosts of a workload domain have the same operating system version.

In various embodiments, management component 615 is a group of physical machines and/or virtual machines (VM) that host core cloud infrastructure components necessary for managing a software defined data center (SDDC) in a cloud computing environment that supports customer services. Cloud computing allows ubiquitous, convenient, on-demand network access to a shared pool of configurable computing resources. A cloud computing customer can request allocations of such resources to support services required by those customers. For example, when a customer requests to run one or more services in the cloud computing environment, one or more workload domains may be created based on resources in the shared pool of configurable computing resources. Examples disclosed herein enable customers to define different domain types, security, capacity, availability, and performance requirements for establishing workload domains in server rack deployments without requiring the users to have in-depth knowledge of server rack hardware and configurations.

Virtual resource manager 620 enables the ability for streamlined and automated data center operations and the delivery of service offerings, such as virtual infrastructure (VI) and virtual desktop infrastructure (VDI) environments, based on a SDDC or cloud-based architecture. In some embodiments, an instance of virtual resource manager 620 is deployed on each appliance 610-1 through 610-n as part of a managed cluster of services.

Virtual resource manager 620 manages the physical hardware resources (e.g., hosts) of appliances 610-1 through 610-n. For example, virtual resource manager can create a workload domain out of the underlying physical hardware resources of appliances 610-1 through 610-n. It should be appreciated that underlying physical hardware resources of a workload domain may span one or more physical racks (or smaller units such as a hyper-appliance or half rack) such that virtual resource manager 620 handles physical management of those resources.

Virtual resource manager 620 tracks available capacity in appliances 610-1 through 610-n, maintains a view of a logical pool of virtual resources, and translates logical resource provisioning to allocation of physical hardware resources. Virtual resource manager 620 interfaces with components of the virtual environment 600 to manage and present a logical view of underlying resources such as hosts and clusters. Virtual resource manager 620 also uses the logical view for orchestration and provisioning of workloads.

Lifecycle manager 630 enables automated updating of components of virtual environment 600. In some embodiments, lifecycle manager 630 is communicatively coupled to a software repository for accessing software updates. For example, lifecycle manager 630 receives notification of update availability for a component of virtual environment 600, downloads the update bundle, selects update targets, schedules the update, and applies the update to the target according to the schedule.

In some embodiments, virtual environment is communicatively coupled to an operating system repository 640. Operating system repository 640 is a repository of available operating system versions. It should be appreciated that operating system repository 640 can be remote to virtual environment 600, local to virtual environment 600, or a combination thereof. For example, management component 615 can retrieve an operating system version from operating system repository 640 for applying to a host.

Example Host Allocations within a Virtual Environment

Figure 7:
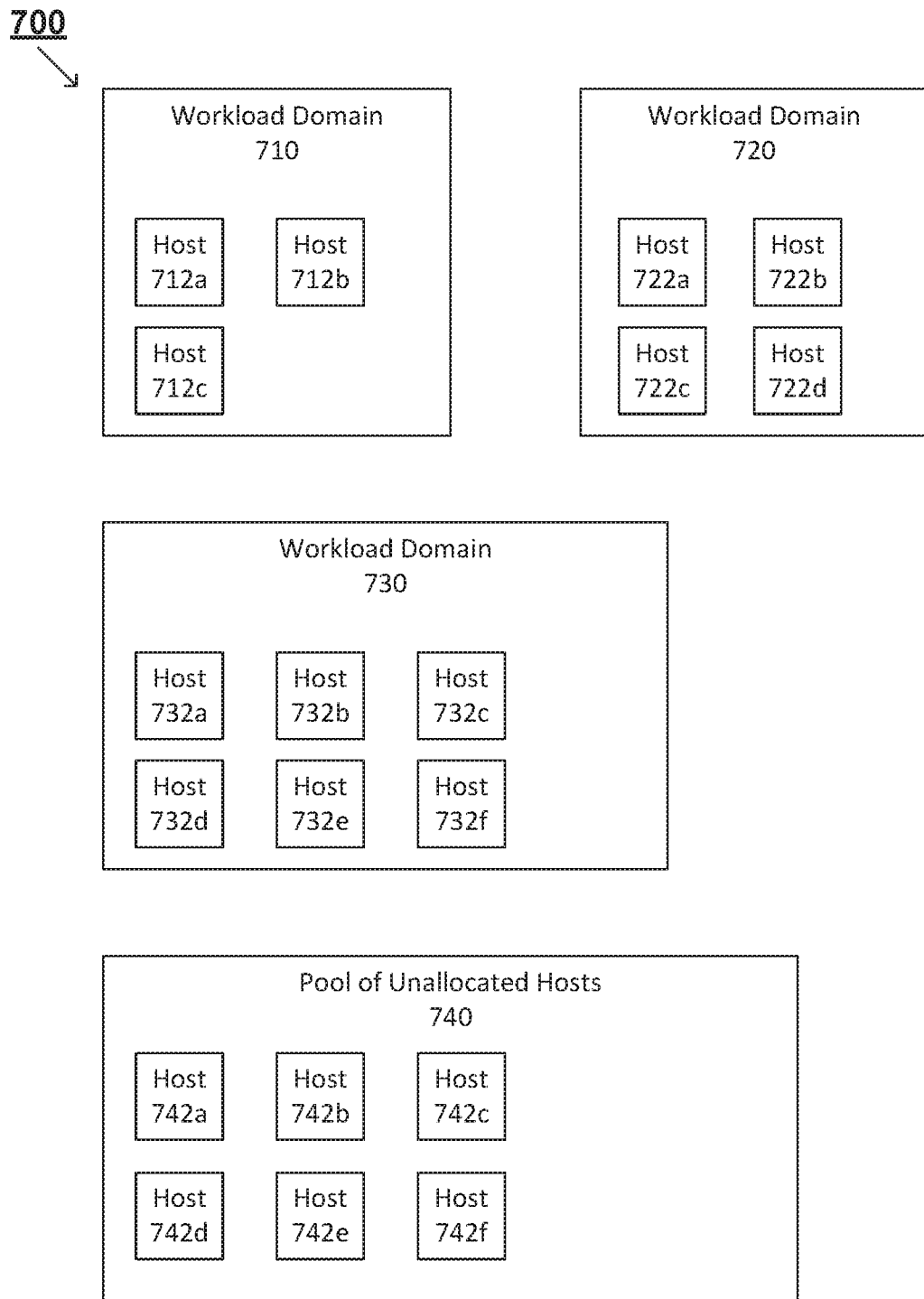
FIG. 7 illustrates an example allocation of hosts to workload domains, in accordance with an embodiment.

FIG. 7 illustrates an example allocation 700 of hosts to workload domains 710, 720, and 730, in accordance with an embodiment. Workload domains 710, 720, and 730, execute on hosts of appliances (e.g., appliances 610-1 through 610-n of FIG. 6). In various embodiments, hosts are allocated to workload domains 710, 720, and 730 according to demand and availability. For example, workload domains 710, 720, and 730 may be used to provision capacity based on user inputs that specify one or more of domain type, security, availability requirements, performance requirements, and capacity requirements. Based on these user inputs, management component 615 determines whether a deployment is possible. If a deployment is possible, the management component 615 determines an optimal host set that meets the user-specified requirements. It should be appreciated that allocation of the hosts of workload domains 710, 720, and 730 may be based on a policy-driven approach that can be specified and changed by a user.

Hosts can be added to or removed from workload domains 710, 720, and 730, and workload domains may be added or deleted. When hosts are released from workload domains they get released to pool of unallocated hosts 740 so that they can be allocated to other workload domains.

As illustrated in FIG. 7, workload domain 710 includes hosts 712a through 712c, workload domain 720 includes hosts 722a through 722d, and workload domain 730 includes hosts 732a through 732c. Pool of unallocated hosts 740 includes hosts 742a through 742f. It should be appreciated that allocation 700 can include any number of workload domains and hosts, of which the illustrated allocation is an example.

In accordance with various described embodiments, all hosts allocated to a particular workload domain have the same operating system version. For example, hosts 712a through 712c of workload domain 710 have the same operating system version. However, it should be appreciated that workload domains need not have the same operating system version as other workload domains. Moreover, hosts can only be allocated to one workload domain at any given time, and may not be allocated to multiple workload domains at the same time.

In general, each host has an operating system version that is within a range of supported operating system versions. In various embodiments, the range of supported operating systems allows for backward compatibility of operating system versions for a certain number of operating system version releases. It should be appreciated that it is possible, with the passage of time and upgrades to the operating system versions on the hosts, that on a single appliance with hosts allocated to more than one workload domain may have hosts with distinct operating system version. For example, if an appliance has ten hosts, with five hosts on a first workload domain and five hosts on a second workload domain, it is possible that the hosts on the first workload domain have an operating system version X (e.g., $OS_x$) and the hosts on the second workload domain have an operating system version X+1 (e.g., $OS_{x+1}$).

Figure 8:
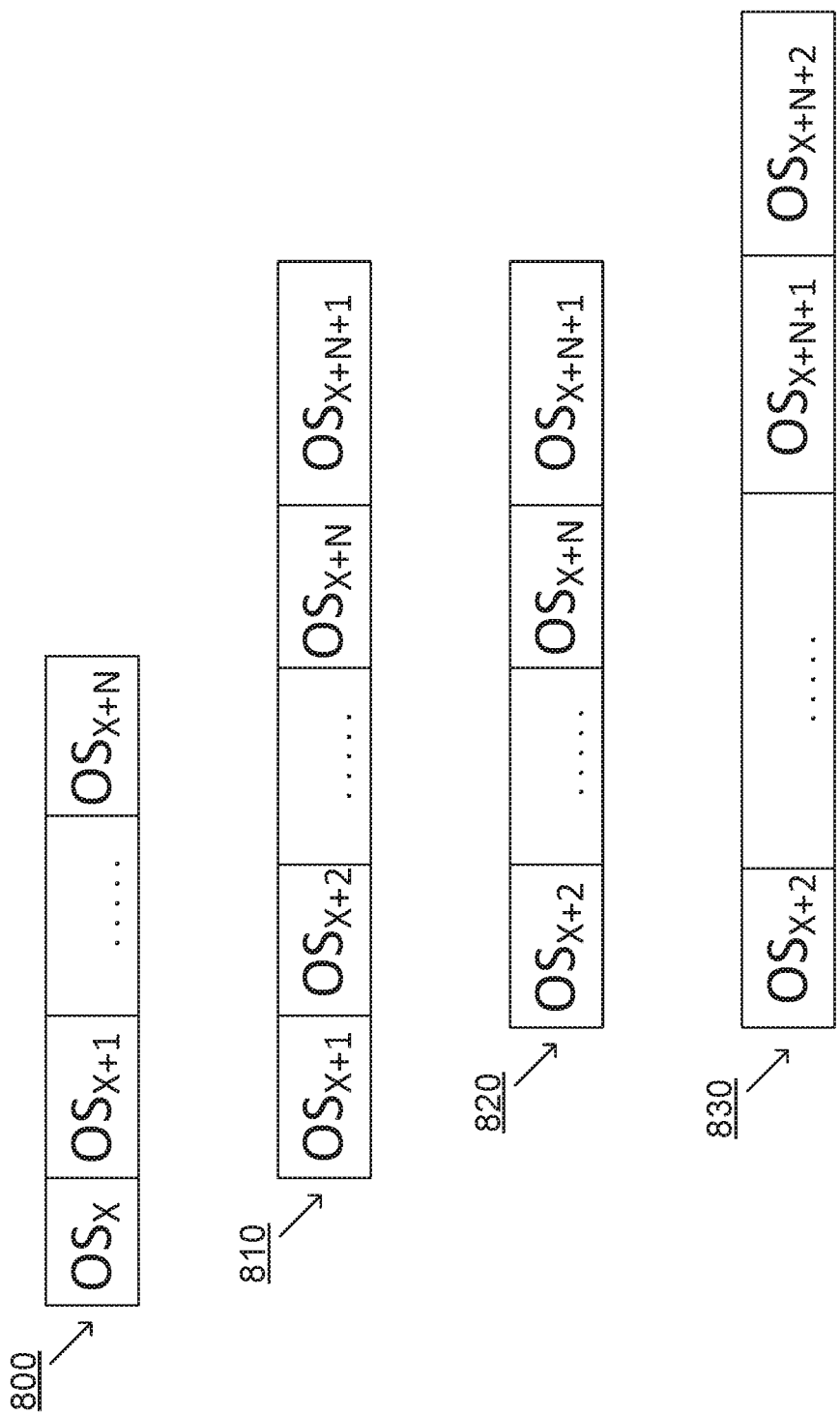
FIG. 8 illustrates example ranges of supported operating system versions, in accordance with various embodiments.

FIG. 8 illustrates example ranges of supported operating system versions, in accordance with various embodiments. Upgrades of operating system versions of hosts of appliances are supported within these ranges, where only one range is available at any given time. Range 800 illustrates a first range of supported operating system versions supporting N releases of operating system versions, including operating system version X (e.g., $OS_x$) through operating system version X+N (e.g., $OS_{x+N}$). Where range 800 is the supported range of operating system versions, upgrades of the operating system versions on the workload domains is only available within the bounds of range 800.

Range 810 is a second range of supported operating system versions that also supports N releases of operating system versions. Range 810 represents a range at a time after support for $OS_x$ has expired and support for $OS_{x+N+1}$ has been added. As illustrated in range 810, the first supported operating system version has changed relative to range 800 from $OS_x$ to $OS_{x+1}$, while the last supported operating system has changed relative to range 800 from $OS_{x+N}$ to $OS_{x+N+1}$. For instance, the ranges of support operating system versions may be sliding support windows that support N versions of the operating system, with the actual supported versions changing over time. For example, $OS_x$ may have aged out of its support requirement as there may no longer be a need for backwards compatibility to $OS_x$ or $OS_x$ may have a security flaw that requires its replacement as a result of the release of a new operating system version $OS_{x+N+1}$.

Range 820 is a third range of supported operating systems that supports N−1 releases of operating system versions. Range 820 represents a range at a time after support for $OS_{x+1}$ has expired and through support for $OS_{x+N+1}$. As illustrated in range 820, the first supported operating system version has changed relative to range 810 from $OS_{x+1}$ to $OS_{x+2}$, while the last supported operating system version remains $OS_{x+N+1}$ relative to range 810. For example, $OS_{x+1}$ may have aged out of its support requirement as there may no longer be a need for backwards compatibility to $OS_{x+1}$ or $OS_{x+1}$ may have a security flaw that requires its replacement without the release of an operating system version subsequent $OS_{x+N+1}$.

Range 830 is a fourth range of supported operating systems that supports N releases of operating system versions. Range 830 represents a range at a time after support for $OS_{x+1}$ has expired and support for $OS_{x+N+2}$ has been added. As illustrated in Range 830, the first supported operating system version remains the same relative to range 820, while the last supported operating system has changed relative to range 820 from $OS_{x+N+1}$ to $OS_{x+N+2}$. For example, support for a newly released operating system version $OS_{x+N+2}$ may have been added.

It should be appreciated that ranges 800 through 830 may apply to versions of any operating system. Moreover, it should be appreciated that the embodiments illustrated in ranges 800 through 830 are examples, and that other ranges are possible. Furthermore, it should be appreciated that the ranges of supported operating system versions need not include all operating system versions between the first operating system version of a range and the last operating system version of the range. For example, an operating system version that was previously supported may include a security flaw that requires it no longer be supported. In such a situation, the range of supported operating system versions would not include the non-supported operating system version.

Example Host Allocations within a Virtual Environment

Figure 9A:
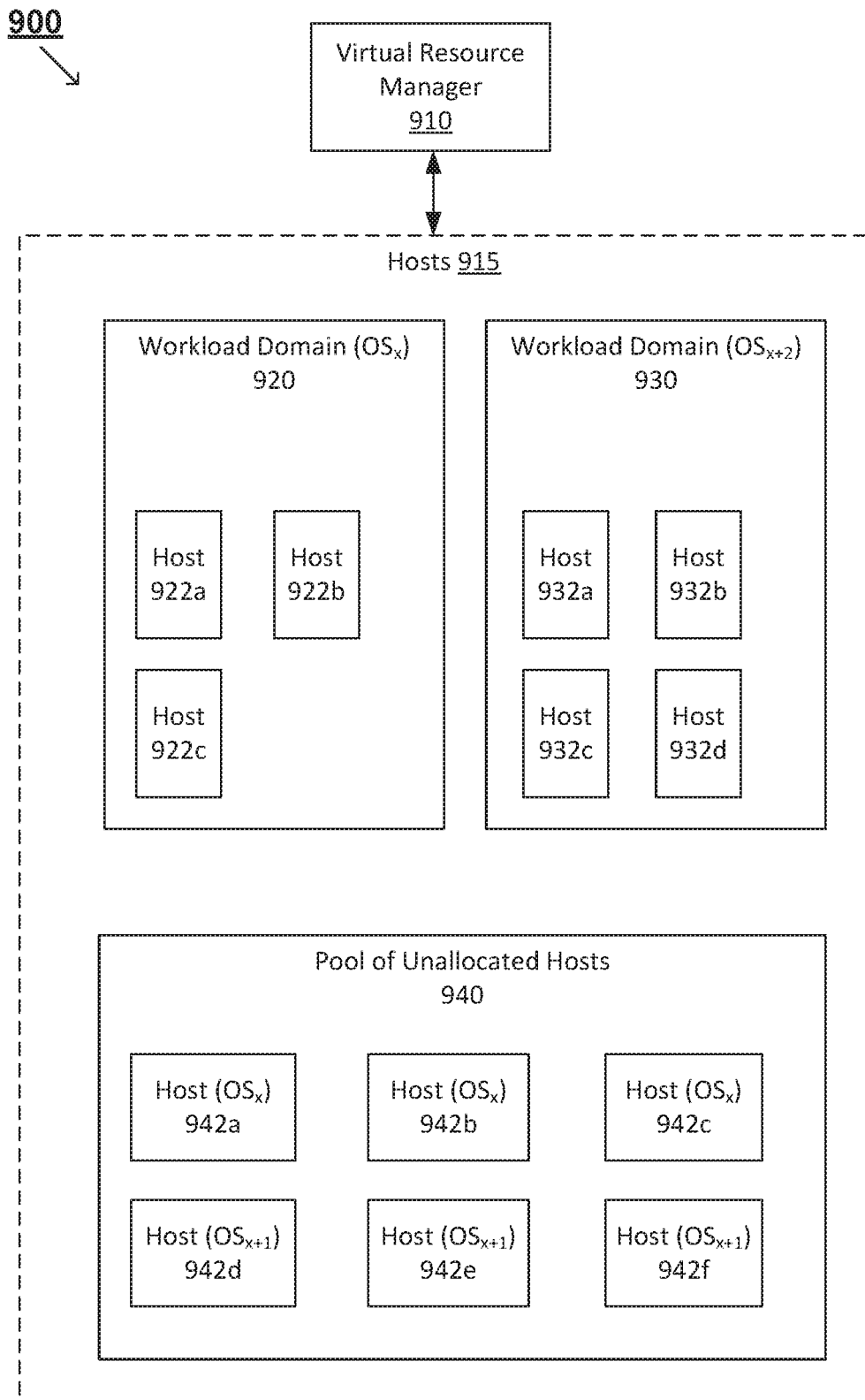
FIGS. 9A through 9C illustrate example block diagrams of components of virtualization infrastructure for managing hosts of appliances, in accordance with various embodiments.
Figure 9B:
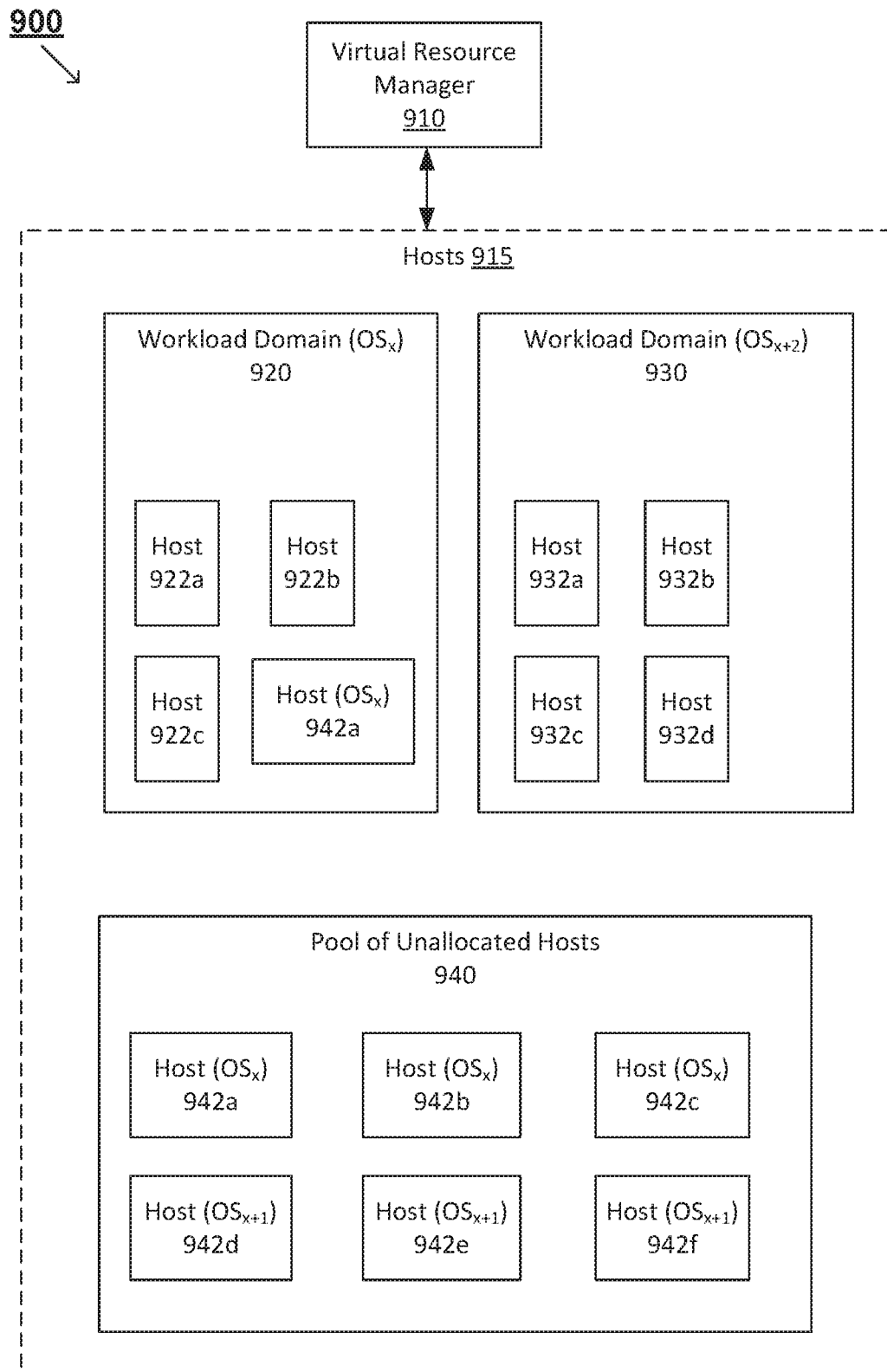
Figure 9C:
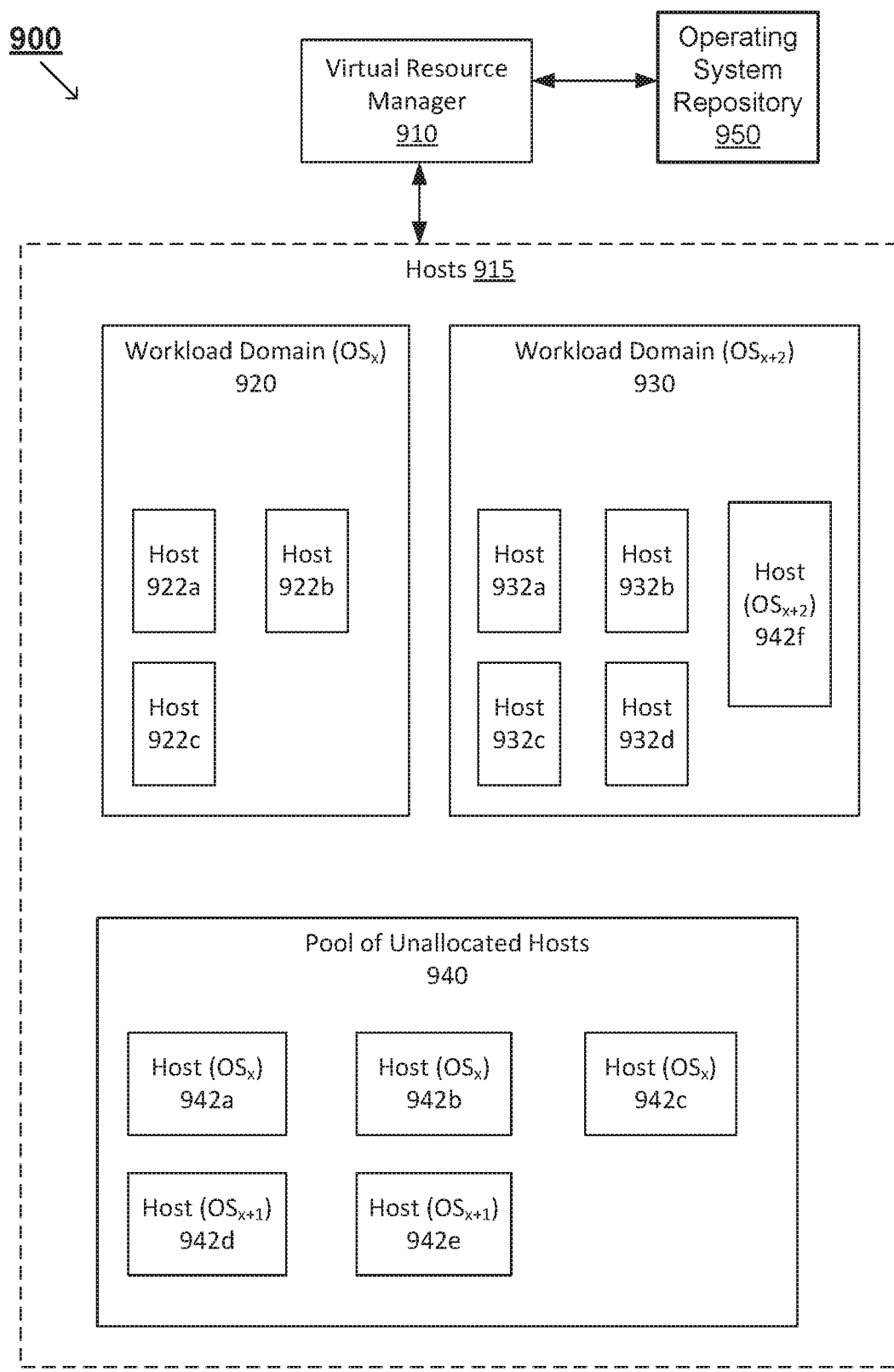

In one embodiment, a host is provisioned to a workload domain from a pool of unallocated hosts according to an operating system of the workload domain. With reference to FIGS. 9A through 9C, example block diagrams of components of virtualization infrastructure 900 for managing hosts 915 of appliances (e.g., appliance 610-1 through 620-n of FIG. 6) are illustrated, according to embodiments. It should be appreciated that virtualization infrastructure 900 may include other components, as described above, and that FIGS. 9A through 9C illustrates certain components so as to not obfuscate the described embodiments.

With reference to FIG. 9A, as illustrated, virtualization infrastructure 900 includes virtual resource manager 910 and hosts 915 which are allocable to workload domains 920 and 930. As described above, it should be appreciated that hosts 915 can be included within one or more appliances, such that hosts of different appliances can be allocated to a workload domain and that hosts of the same appliance can be allocated to different workload domains. Virtualization infrastructure 900 supports a range of supported operating systems from $OS_x$ through $OS_{x+2}$.

Hosts 922a through 922c are allocated to workload domain 920, where workload domain 920 includes hosts having operating system version $OS_x$, and hosts 932a through 932d are allocated to workload domain 930, where workload domain 930 includes hosts having operating system version $OS_{x+2}$. Pool of unallocated hosts 940 includes hosts 942a through 942f, where hosts 942a, 942b, and 942c, have operating system version $OS_x$, hosts 942d and 942e have operating system version $OS_{x+1}$, and host 942f has operating system version $OS_{x+2}$.

In one embodiment, virtual resource manager 910 is configured to receive a command to add a host to workload domain 920. In response to the command, virtual resource manager selects a host from pool of unallocated hosts 940 that has the same operating system version as workload domain 920. As illustrated in FIG. 9B, host 942a, having $OS_x$, is allocated to workload domain 920.

In another embodiment, a command is received at virtual resource manager 910 to add a host to workload domain 930. Virtual resource manager 910 determines that pool of unallocated hosts 940 does not include a host that has the same operating system version as workload domain 930 ($OS_{x2}$). Virtual resource manager 910 is configured to select an unallocated host from pool of unallocated hosts 940 and update the operating system version of the selected host such that it has the same operating system version as workload domain 930. In one embodiment, an unallocated host having the oldest operating system version is selected for updating (e.g., host 942a, 942b, or 942c, having $OS_x$). In another embodiment, an unallocated host having the closest preceding operating system version is selected for updating (e.g., host 942d, 942e, or 942f, having $OS_x$).

In one embodiment, with reference to FIG. 9C, the operating system version of the allocated hosts of workload domain 930 is retrieved from an operating system version repository (e.g., operating system version repository 950). The operating system version retrieved from the operating system version repository is applied to unallocated host 942f, updating the operating system version to $OS_{x+2}$. In one embodiment, the unallocated host is reimaged to the operating system version of the allocated hosts of workload domain 930. Upon completion of the updating, as illustrated in FIG. 9C, the unallocated host, now having the same operating system version as workload domain 930, can be allocated to workload domain 930.

In one embodiment, virtual resource manager 910 is configured to receive a command to remove a host from a workload domain. Responsive to such a command, virtual resource manager is operable to release the host to pool of unallocated hosts 940.

Figure 10A:
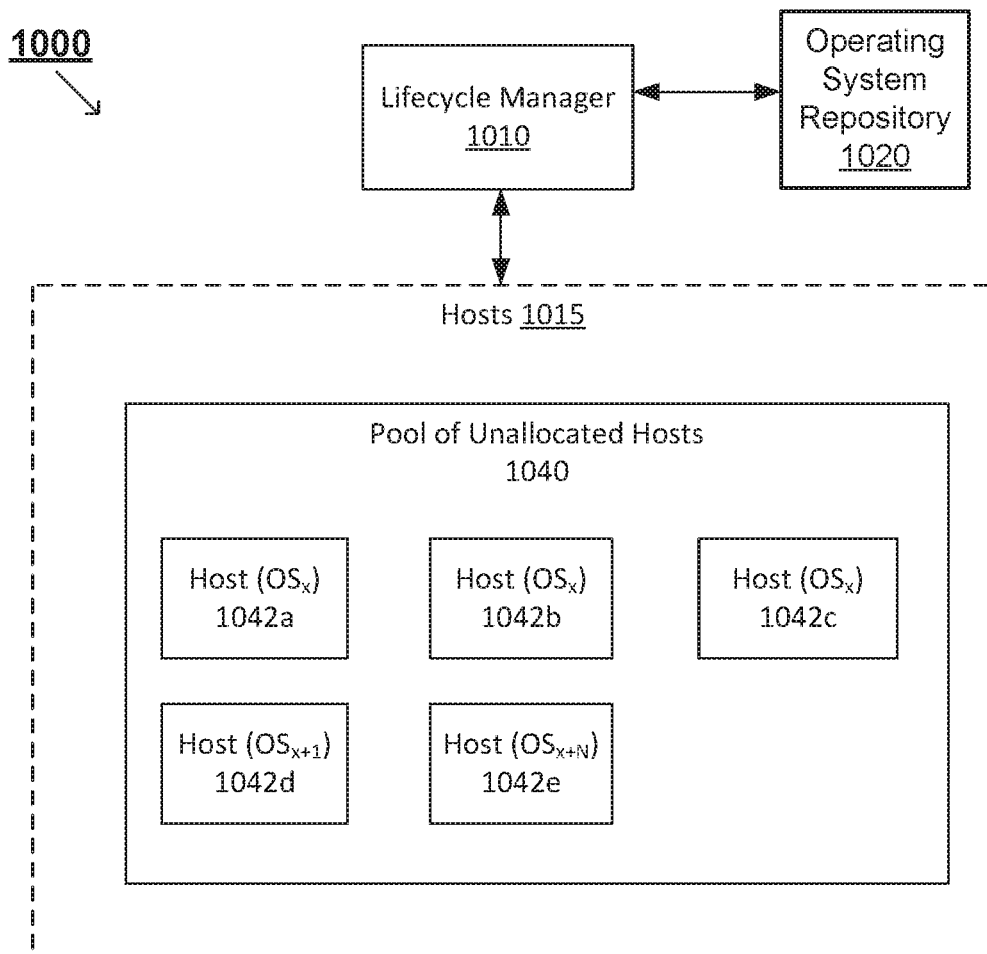
FIGS. 10A through 10C illustrate example block diagrams of components of virtualization infrastructure for automatically updating operating system versions of unallocated hosts, in accordance with various embodiments.
Figure 10B:
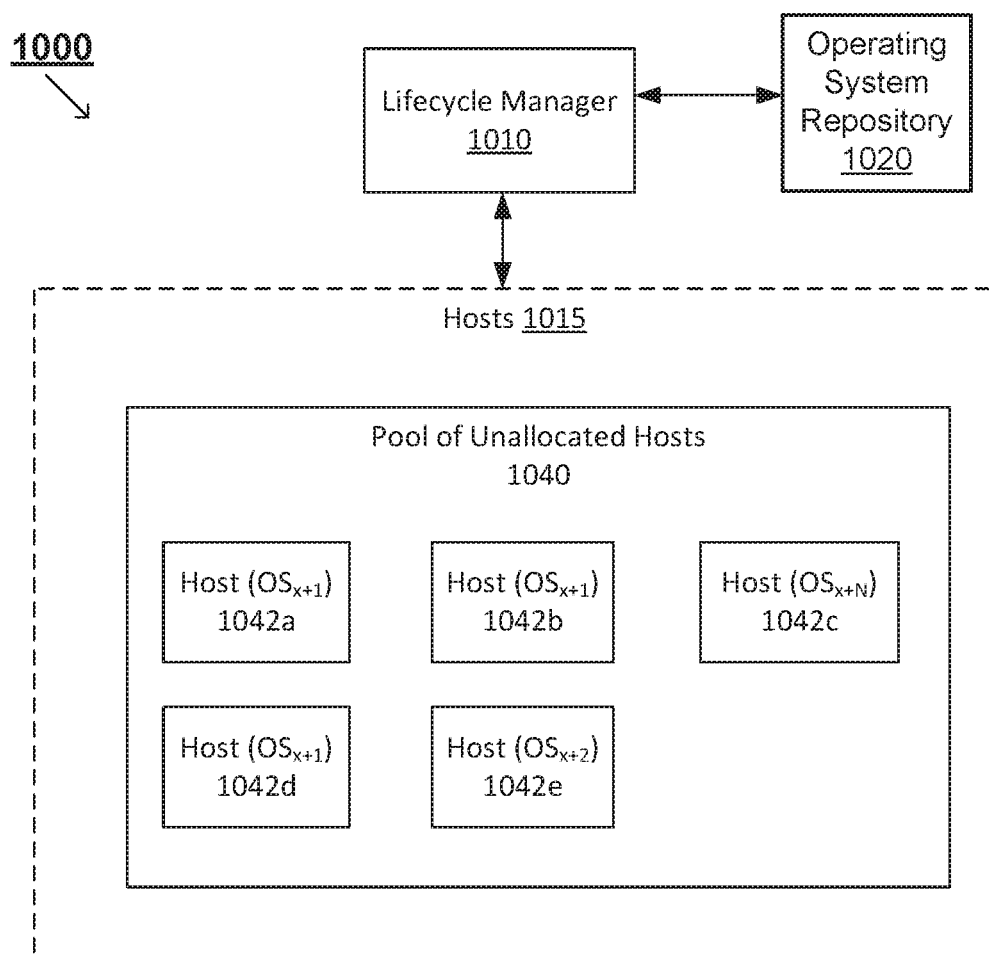
Figure 10C:
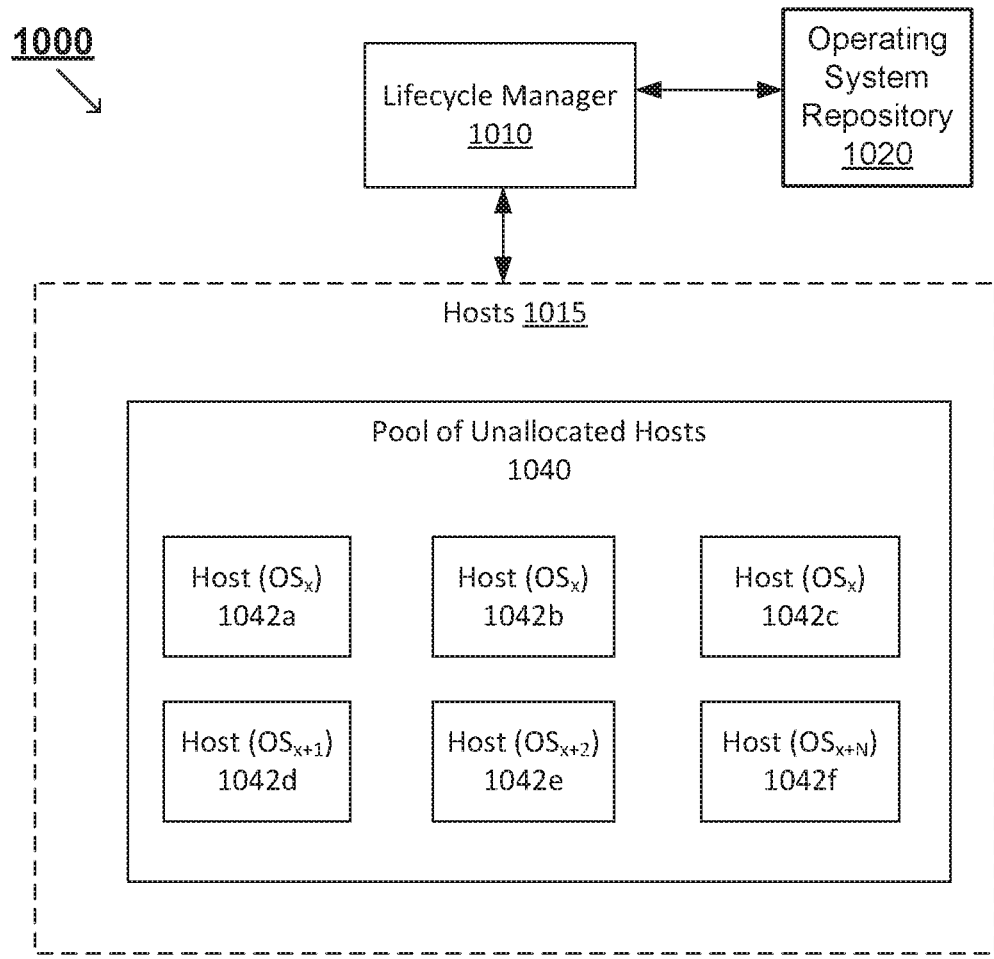

In one embodiment, unallocated hosts are managed such that the unallocated hosts are automatically updated to have an operating system version within a range of supported operating system versions. With reference to FIGS. 10A through 10C, an example block diagram of components of virtualization infrastructure 1000 for managing hosts 1015 of appliances (e.g., appliance 610-1 through 620-n of FIG. 6) is illustrated, in accordance with an embodiment. It should be appreciated that virtualization infrastructure 1000 may include other components, as described above, and that FIGS. 10A through 10C illustrates certain components so as to not obfuscate the described embodiments.

As illustrated in FIG. 10A, virtualization infrastructure 1000 includes lifecycle manager 1010 and hosts 1015 including pool of unallocated hosts 1040. As described above, it should be appreciated that hosts 1015 can be included within one or more appliances, such that hosts of different appliances can be allocated to a workload domain and that hosts of the same appliance can be allocated to different workload domains. Lifecycle manager 1010 is configured to monitor unallocated hosts and ensure that the operating system versions of the unallocated hosts of pool of unallocated hosts 1040 are within the range of supported operating system versions.

At a first time, as illustrated in FIG. 10A, virtualization infrastructure 1000 supports a range of supported operating system versions from $OS_x$ through $OS_{x+N}$. As illustrated, hosts 1042a through 1042f all have an operating system version within the range of supported operating system versions. Lifecycle manager 1010 is configured to determine whether an unallocated host of the pool of unallocated hosts 1040 has an operating system version outside of the range of supported operating system versions.

In one embodiment, the operating system versions of hosts of pool of unallocated hosts 1040 is compared to the range of supported operating system versions. If the operating system version is not within the range of supported operating system versions, it is determined to be outside the range of supported operating system versions. In one embodiment, pool of unallocated hosts 1040 is scanned to determine operating system versions of the unallocated hosts. The operating system versions of the unallocated hosts are then compared to the range of supported operating system versions.

In response to determining that an unallocated host of the pool of unallocated hosts 1040 has an operating system version outside of the range of supported operating system versions, lifecycle manager 1010 automatically update the operating system version of the unallocated hosts to an operating system version within the range of supported operating system versions.

In one embodiment, as illustrated in FIG. 10B, lifecycle manager 1010 receives an indication that the range of supported operation system versions has changed and no longer supports operating system version X ($OS_x$). For example, $OS_x$ may have reached the end of its support lifetime. Lifecycle manager 1010 determines that hosts 1042a through 1042c have operating system versions outside of the range of supported operation system versions. Lifecycle manager 1010 is configured to update the operating system versions of hosts 1042a through 1042c so that the operating system versions are within the range of supported operating system version.

In one embodiment, an operating system version within the range of supported operating system versions is retrieved from an operating system version repository (e.g., operating system version repository 1020). The operating system version retrieved from the operating system version repository is applied to unallocated hosts 1042a through 1042c, updating the operating system version of hosts 1042a and 1042b to $OS_{x+1}$ and the operating system version of host 1042c to $OS_{x+N}$. In one embodiment, the unallocated host is reimaged to the retrieved operating system version. It should be appreciated that the unallocated hosts that are being updated can be updated to any operating system version within the range of supported operating system version.

In another embodiment, as illustrated in FIG. 10C, a new host 1042f is released to pool of unallocated hosts 1040 for allocation to a workload domain. In one embodiment, host 1042f is received in response to being released by a workload domain. In another embodiment, host 1042f is received in response to a new appliance being added to virtualization infrastructure 1000. At the time of release, lifecycle manager 1010 determines that host 1042f has an operating system version that is not within the range of supported operating system versions.

In one embodiment, an operating system version within the range of supported operating system versions is retrieved from an operating system version repository (e.g., operating system version repository 1020). The operating system version retrieved from the operating system version repository is applied to unallocated host 1042f, updating the operating system version of host 1042c to $OS_{x+N}$. In one embodiment, the unallocated host is reimaged to the retrieved operating system version.

Figure 11A:
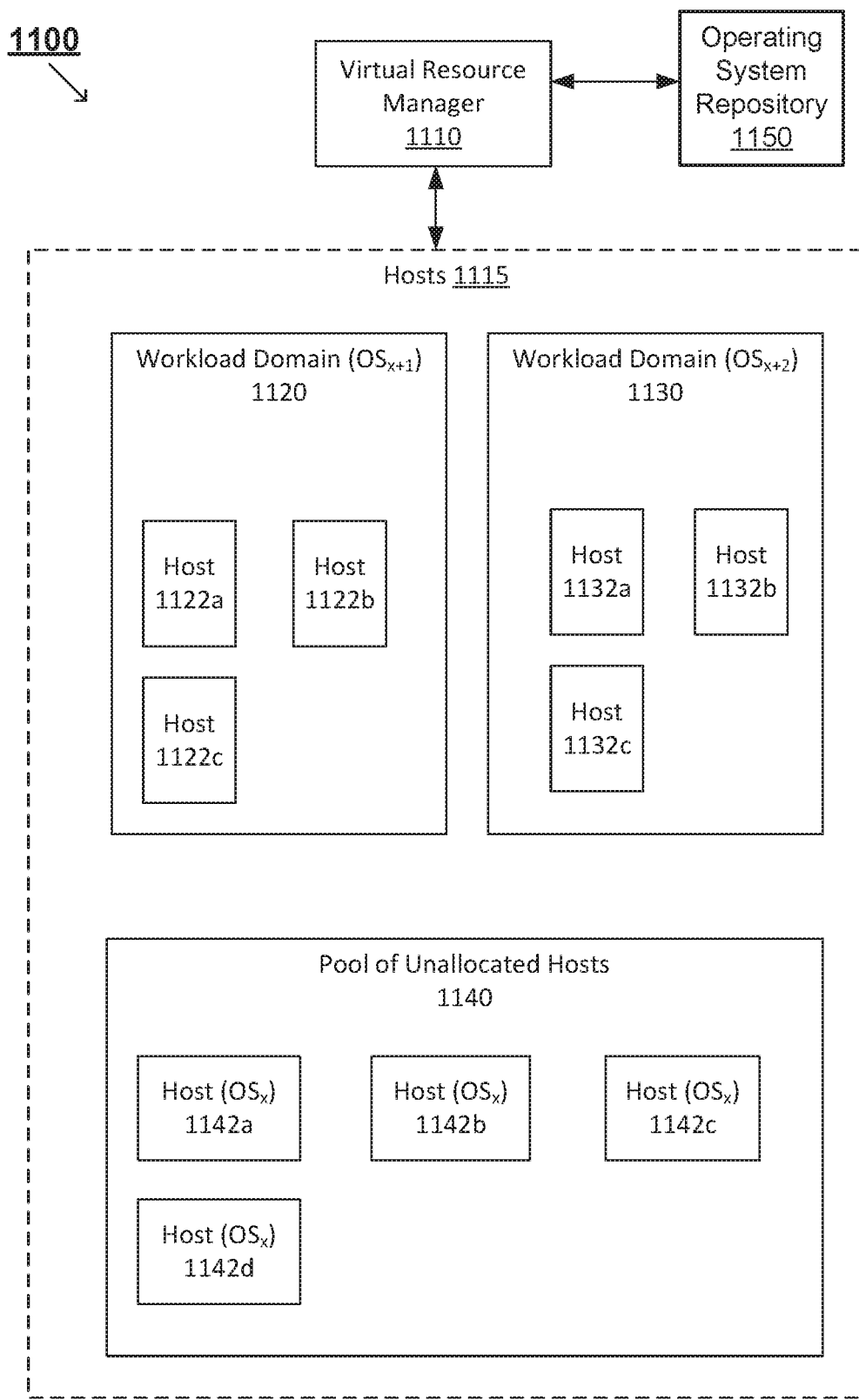
FIGS. 11A through 11C illustrate example block diagrams of components of virtualization infrastructure for maintaining a baseline operating system version for unallocated hosts, in accordance with various embodiments.
Figure 11B:
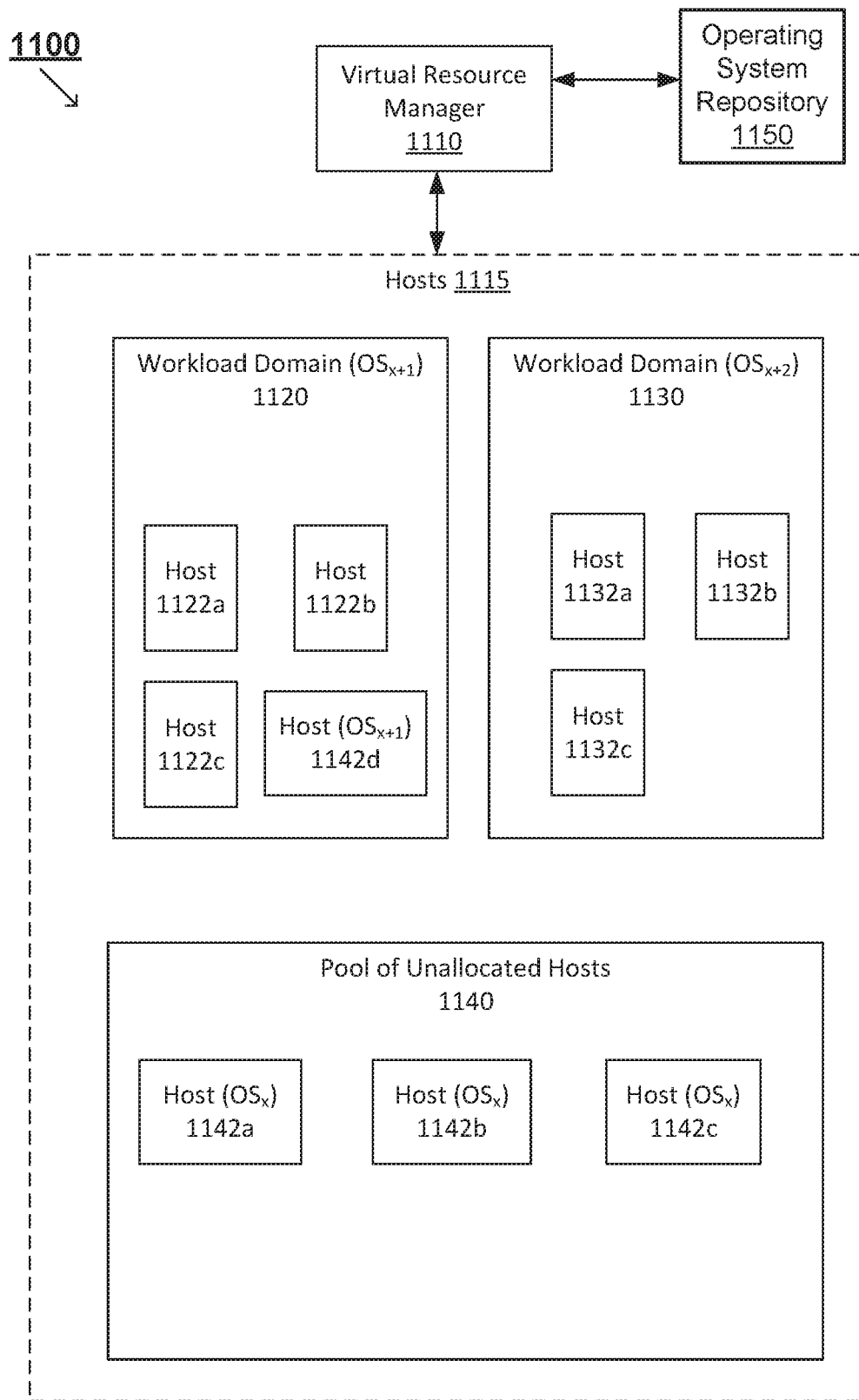
Figure 11C:
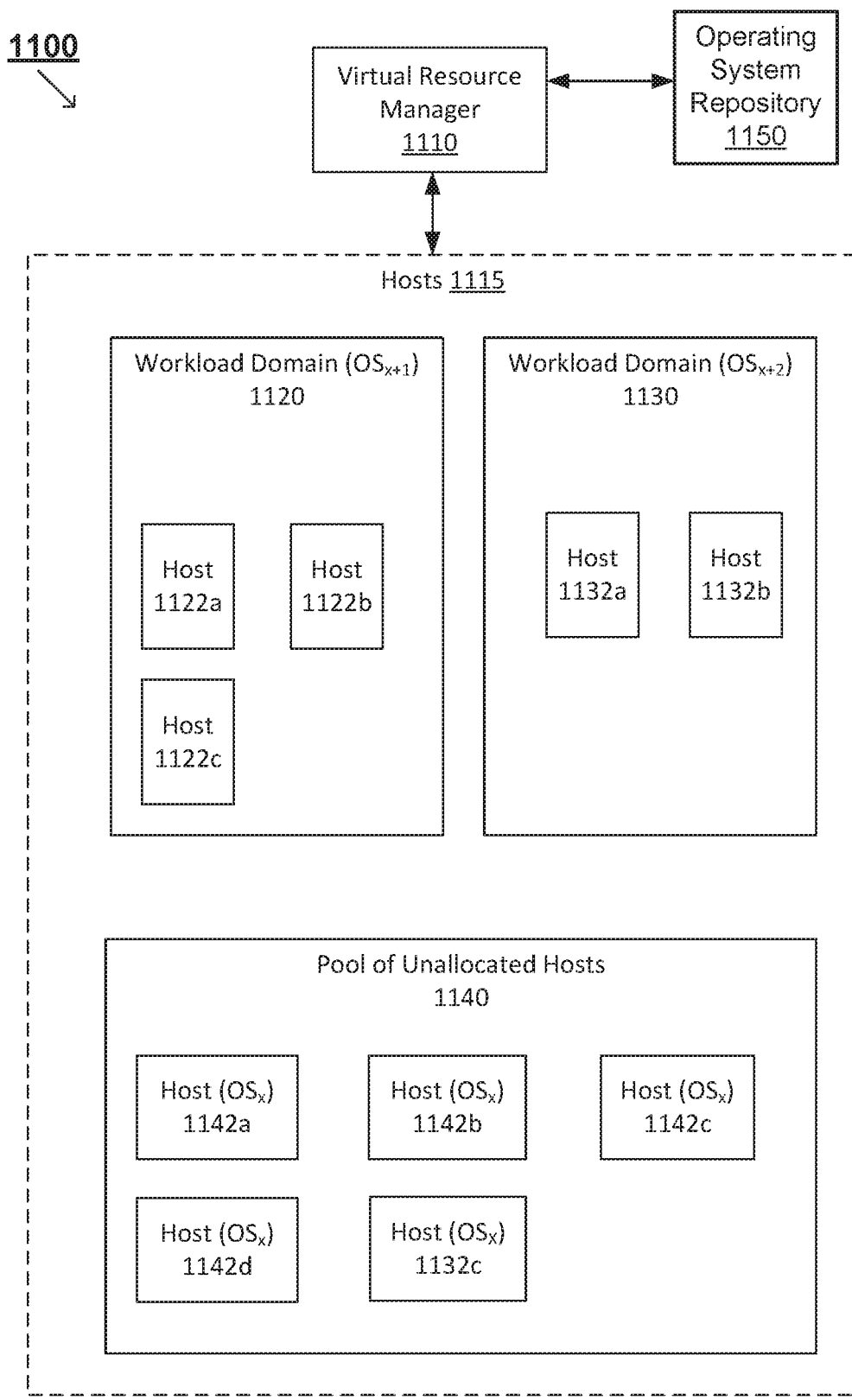

In one embodiment, unallocated hosts are managed such that the unallocated hosts are maintained at a baseline operating system version and are updated to have an operating system version of a workload domain upon allocation. With reference to FIGS. 11A through 11C, an example block diagram of components of virtualization infrastructure 1100 for managing hosts 1115 of appliances (e.g., appliance 610-1 through 620-n of FIG. 6) is illustrated, in accordance with an embodiment. It should be appreciated that virtualization infrastructure 1100 may include other components, as described above, and that FIGS. 11A through 11C illustrates certain components so as to not obfuscate the described embodiments.

As illustrated in FIG. 11A, virtualization infrastructure 1100 includes virtual resource manager 1110 and hosts 1115 including pool of unallocated hosts 1140. As described above, it should be appreciated that hosts 1115 can be included within one or more appliances, such that hosts of different appliances can be allocated to a workload domain and that hosts of the same appliance can be allocated to different workload domains. Virtual resource manager 1110 is configured to monitor unallocated hosts and ensure that the operating system versions of the unallocated hosts of pool of unallocated hosts 1140 are within the range of supported operating system versions.

Unallocated hosts of pool of unallocated hosts 1140, hosts 1142a through 1142d as illustrated, are maintained at a baseline operating system version of a range of supported operating system versions. A baseline operating system version is a selected operating system version of the range upon which patches and update s might be applied to bring the operating system version of the unallocated host to the required operating system version for allocation (e.g., the operating system version of the workload to which the unallocated host is allocated). While the baseline operating system version illustrated in FIGS. 11A through 11C is the first operating system version of the supported range (OS)), it should be appreciated that the baseline operating system version can be any operating system version of the range of supported operating system versions.

As illustrated in FIG. 11B, a command is received at virtual resource manager 1110 to allocate host 1142d to workload domain 1120. While host 1142d was maintained in pool of unallocated hosts 1140, host 1142d had an operating system version $OS_x$. As hosts of workload domain 1120 have operating system version $OS_{x+1}$, it is necessary to update the operating system version of host 1142d to operating system version $OS_{x+1}$.

In one embodiment, the operating system version of the allocated hosts of workload domain 1120 is retrieved from an operating system version repository (e.g., operating system version repository 1150). The operating system version retrieved from the operating system version repository is applied to unallocated host 1142d, updating the operating system version to $OS_{x+1}$. In one embodiment, the unallocated host is reimaged to the operating system version of the allocated hosts of workload domain 1120. In one embodiment, a patch is applied to the operating system version of host for 1142*d* updating the operating system version of host 1142*d* to the operating system version of workload domain 1120. Upon completion of the updating, host 1142*d*, now having the same operating system version as workload domain 1120, can be allocated to workload domain 1120.

As illustrated in FIG. 11C, a command is received at virtual resource manager 1110 to release host 1132*c* from workload domain 1130. As hosts of workload domain 1130 have operating system version $OS_{x+2}$, it is necessary to update the operating system version of host 1132*c* to operating system version $OS_x$ for inclusion in pool of unallocated hosts 1140. In another embodiment, a command is received at virtual resource manager 1110 to delete a workload domain, resulting in the hosts of the workload domain being released. In another embodiment, a new host is received in response to a new appliance being added to virtualization infrastructure 1100.

In one embodiment, the baseline operating system version of is retrieved from an operating system version repository (e.g., operating system version repository 1150). The baseline operating system version retrieved from the operating system version repository is applied to host 1132*c*, updating the operating system version to $OS_x$. In one embodiment, the host is reimaged to the baseline operating system version. Upon completion of the updating, host 1132*c*, now having the baseline operating system version, is released to pool of unallocated hosts 1140 for allocation to a workload domain.

Example Methods of Operation of Managing Operating System Versions of Hosts of a Pre-Configured Hyper-Converged Computing Device The following discussion sets forth in detail the operation of some example methods of operation of embodiments. With reference to FIGS. 12 through 15, flow diagrams 1200 through 1500 illustrate example procedures used by various embodiments. Flow diagrams 1200 through 1500 include some procedures that, in various embodiments, are carried out by a processor under the control of computer-readable and computer-executable instructions. In this fashion, procedures described herein and in conjunction with flow diagrams 1200 through 1500 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or virtualized environment 120). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 1200 through 1500 such procedures are examples. That is, embodiments are well suited to performing various other procedures or variations of the procedures recited in flow diagrams 1200 through 1500. Likewise, in some embodiments, the procedures in flow diagrams 1200 through 1500 may be performed in an order different than presented and/or not all of the procedures described in one or more of these flow diagrams may be performed. It is further appreciated that procedures described in flow diagrams 1200 through 1500 may be implemented in hardware, or a combination of hardware with firmware and/or software provided by appliance 300.

Figure 12:
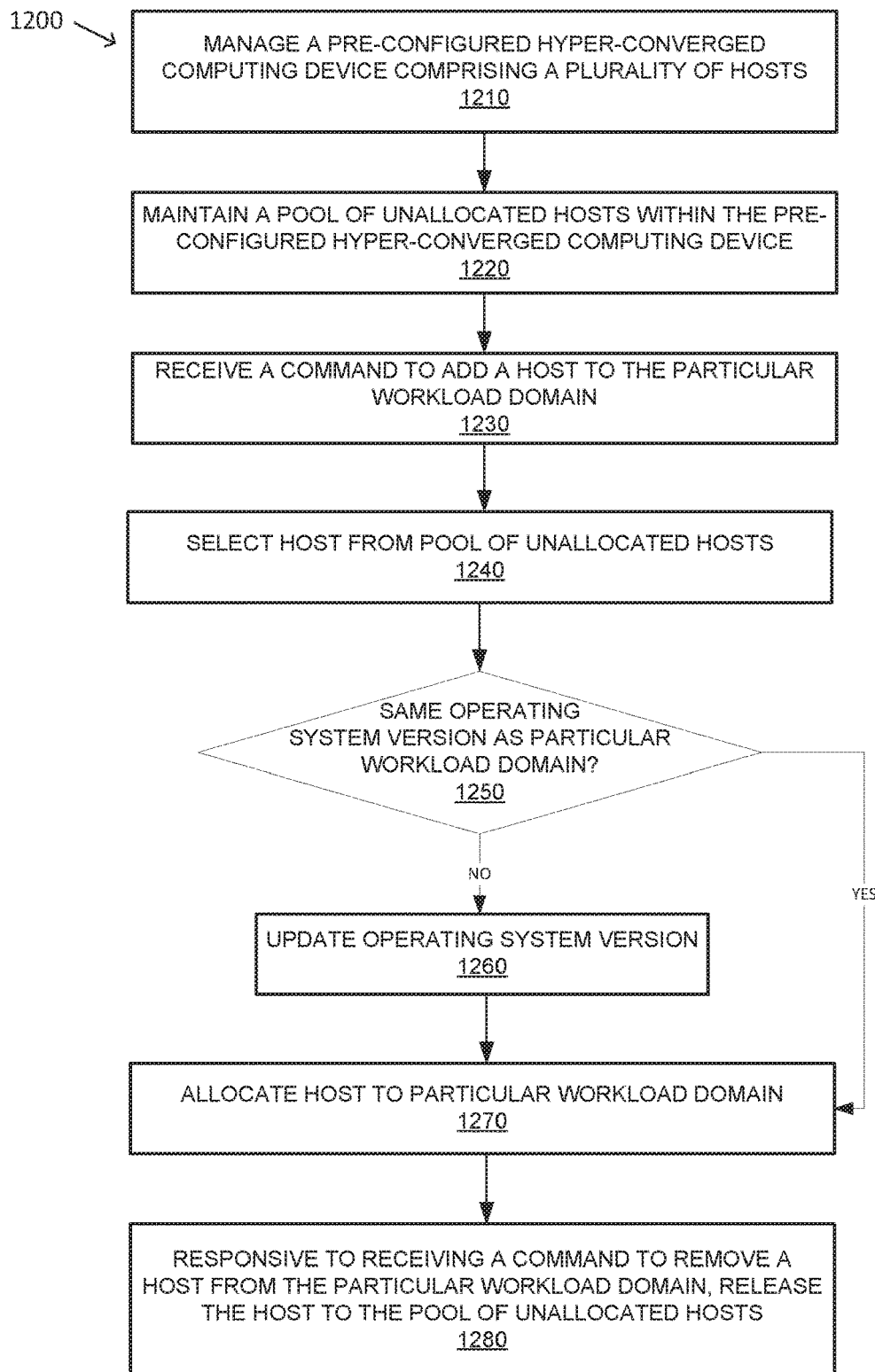
FIG. 12 depicts a flow diagram for provisioning a host of a workload domain of a pre-configured hyper-converged computing device, according to various embodiments.

FIG. 12 depicts a flow diagram 1200 of a method for provisioning a host of a workload domain of a pre-configured hyper-converged computing device, according to various embodiments. At procedure 1210 of flow diagram 1200, a pre-configured hyper-converged computing device comprising a plurality of hosts is managed, where the plurality of hosts is allocable to workload domains, and where allocated hosts of a particular workload domain are of a same operating system version. At procedure 1220, a pool of unallocated hosts is maintained within the pre-configured hyper-converged computing device, where the unallocated hosts of the pool have operating system versions within a range of supported operating system versions.

At procedure 1230, a command to add a host to a particular workload domain is received. At procedure 1240, a host from the pool of unallocated hosts is selected. At procedure 1250, in accordance with an embodiment, it is determined whether the operating system version of the selected host is the same operating system version as the particular workload domain. If the operating system version of the selected host is the same operating system version as hosts of the particular workload domain, flow diagram 1200 proceeds to procedure 1270. If the operating system version of the selected host is not the same operating system version as hosts of the particular workload domain, flow diagram 1200 proceeds to procedure 1260.

Figure 13A:
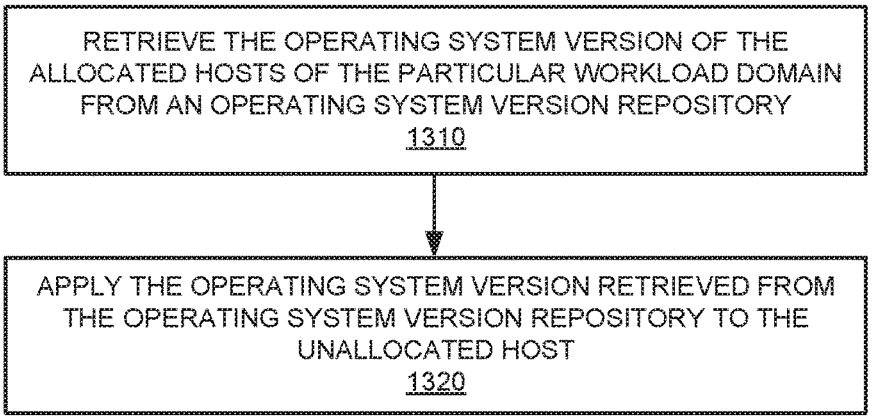
FIGS. 13A through 13C depict flow diagrams for methods for updating an operating system version of a host, according to various embodiments.
Figure 13B:
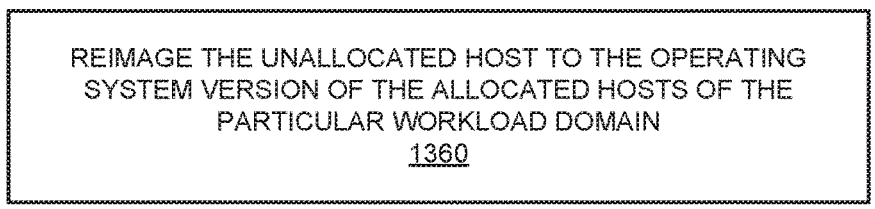
Figure 13C:
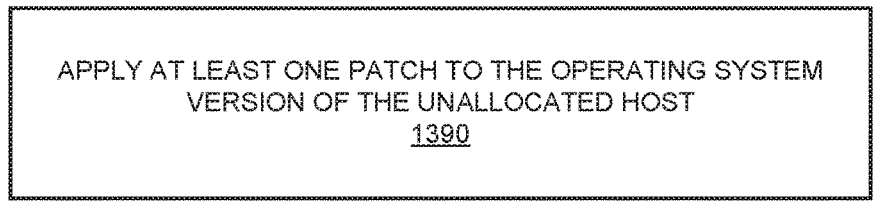

At procedure 1260, the operating system version of the selected host is updated to the same operating system version as host of the particular workload domain. In one embodiment, an unallocated host of the pool of unallocated selected for updating has the oldest operating system version of unallocated hosts of the pool of unallocated hosts. FIGS. 13A through 13C depict flow diagrams 1300, 1350, and 1380, illustrating for methods for updating an operating system version of a host, according to various embodiments.

With reference to FIG. 13A, at procedure 1310 of flow diagram 1300, the operating system version of the allocated hosts of the particular workload domain is retrieved from an operating system version repository. At procedure 1320, the operating system version retrieved from the operating system version repository is applied to the unallocated host to update the operating system version of the unallocated host to the operating system version of the allocated hosts of the particular workload domain.

With reference to FIG. 13B, at procedure 1360 of flow diagram 1350, the unallocated host is reimaged to the operating system version of the allocated hosts of the particular workload domain.

With reference to FIG. 13C, at procedure 1390 of flow diagram 1380, at least one patch is applied to the operating system version of the unallocated host to update the operating system version of the unallocated host to the operating system version of the allocated hosts of the particular workload domain.

With reference to FIG. 12, as shown at procedure 1270, the host of the pool of unallocated hosts is allocated to the particular workload domain. In one embodiment, as shown at procedure 1280, responsive to receiving a command to remove a host from the particular workload domain, the host is released to the pool of unallocated hosts.

Figure 14:
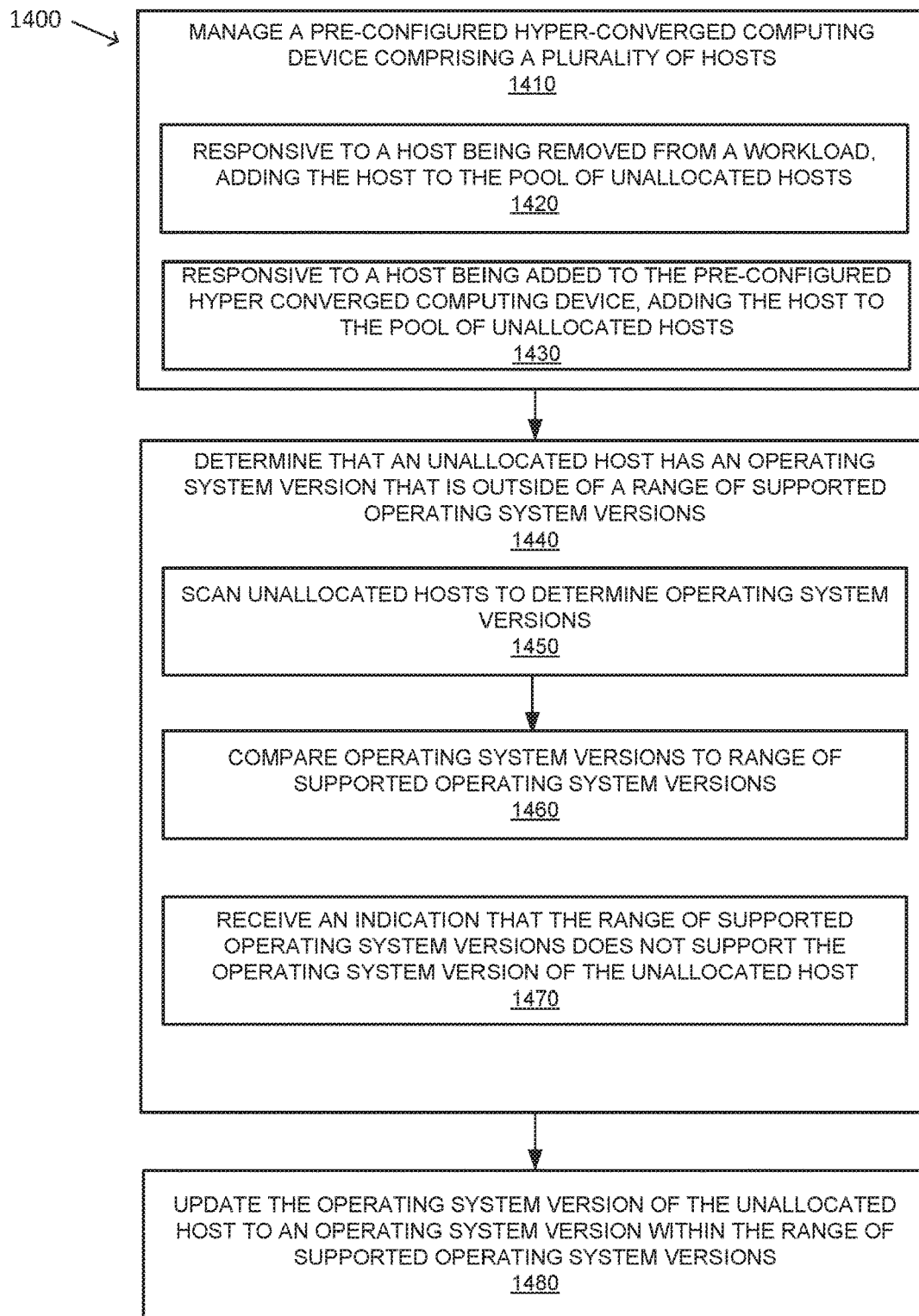
FIG. 14 depicts a flow diagram for a method for managing unallocated hosts of a pre-configured hyper-converged computing device, according to various embodiments.

FIG. 14 depicts a flow diagram 1400 for a method for managing unallocated hosts of a pre-configured hyper-converged computing device, according to various embodiments. At procedure 1410 of flow diagram 1400, a pre-configured hyper-converged computing device comprising a plurality of hosts is managed, where the plurality of hosts is allocable to workload domains, where unallocated hosts of the plurality of hosts is maintained within a pool of unallocated hosts, and where the plurality of hosts each have an operating system version. In one embodiment, as shown at procedure 1420, responsive to a command to remove a host from a workload domain, the host is added to the pool of unallocated hosts. In one embodiment, as shown at procedure 1430, responsive to an addition of a new host to the plurality of hosts of the pre-configured hyper-converged computing device, the new host is added to the pool of unallocated hosts.

At procedure 1440, it is determined that an unallocated host of the pool of unallocated hosts has an operating system version that is outside of a range of supported operating system versions. In one embodiment, as shown at procedure 1450, the unallocated hosts of the pool of unallocated hosts are scanned to determine the respective operating system versions of the unallocated hosts. At procedure 1460, the operating system versions of the unallocated hosts are compared to the range of supported operating system versions. In one embodiment, as shown at procedure 1470, an indication that the range of supported operating system versions does not support the operating system version of the unallocated host is received.

At procedure 1480, the operating system version of the unallocated host having an operating system version outside of the range of supported operating system versions is updated to an operating system version within the range of supported operating system versions. FIGS. 13A through 13C depict flow diagrams 1300, 1350, and 1380, illustrating for methods for updating an operating system version of a host, according to various embodiments.

Figure 15:
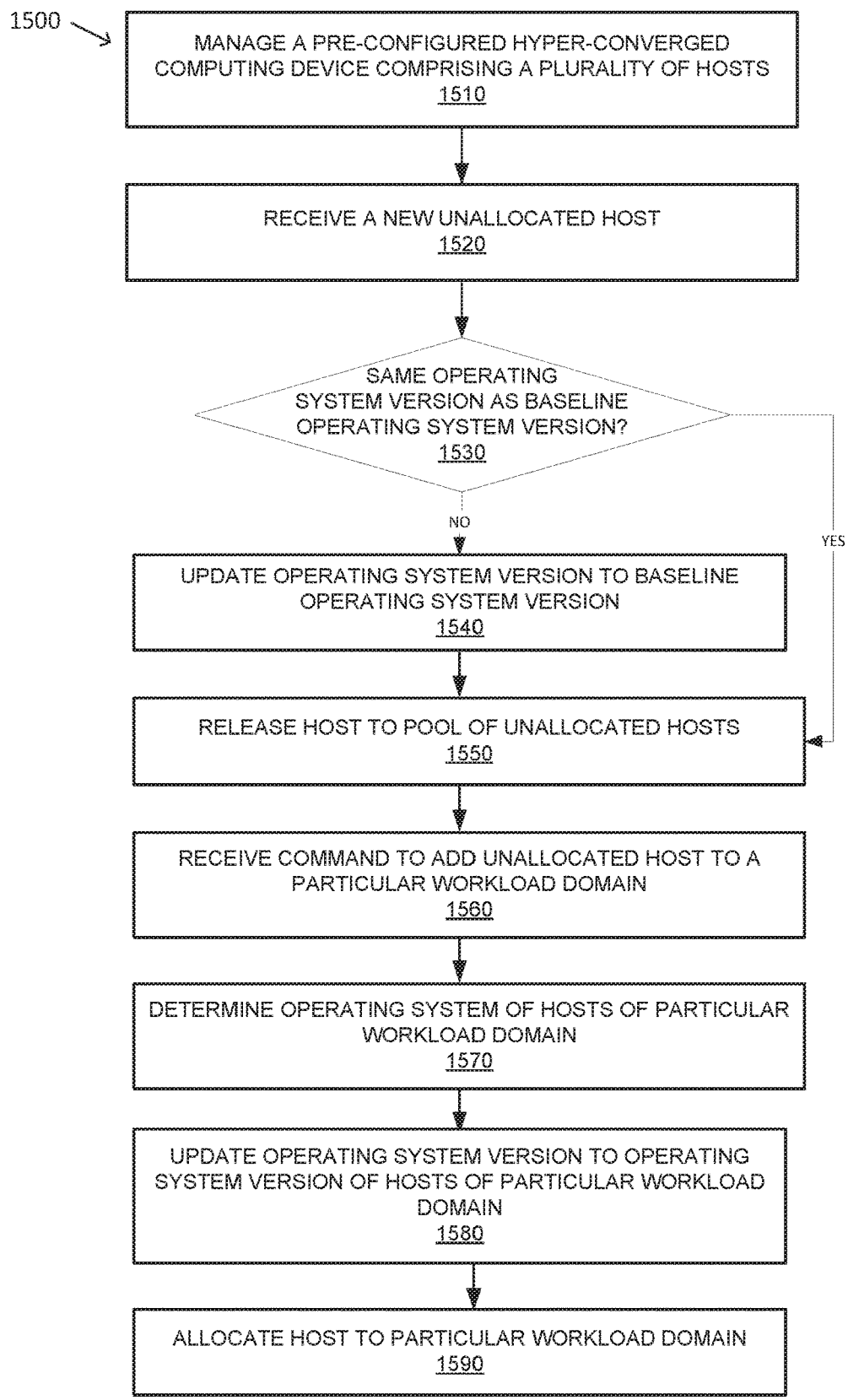
FIG. 15 depicts a flow diagram for a method for maintaining unallocated hosts of a pre-configured hyper-converged computing device at a baseline operating system version, according to various embodiments.

FIG. 15 depicts a flow diagram 1500 for a method for maintaining unallocated hosts of a pre-configured hyper-converged computing device at a baseline operating system version, according to various embodiments. At procedure 1510 of flow diagram 1500, a plurality of hosts of the pre-configured hyper-converged computing device is managed, where the plurality of hosts is allocable to workload domains, where the plurality of hosts each have an operating system version within a range of supported operating system versions, where unallocated hosts of the plurality of hosts are maintained within a pool of unallocated hosts, and where the unallocated hosts of the pool of unallocated hosts have a baseline operating system version of the range of supported operating system versions.

At procedure 1520, a new unallocated host is received at the pre-configured hyper-converged computing device for inclusion to the pool of unallocated hosts. In one embodiment, responsive to receiving a command to remove a host from a particular workload domain, the host removed from the particular workload domain is the new unallocated host. In another embodiment, responsive to receiving a command to remove a particular workload domain from the pre-configured hyper-converged computing device, a host of the particular workload domain is the new unallocated host. In another embodiment, where a new host is added to the plurality of hosts of the pre-configured hyper-converged computing device, the new host is the new unallocated host.

At procedure 1530, it is determined whether the operating system version of the new unallocated host is the same operating system version as a baseline operating system version. If the new unallocated host has the baseline operating system version, flow diagram 1500 proceeds to procedure 1550. If the new unallocated host an operating system version other than the baseline operating system version, flow diagram 1500 proceeds to procedure 1540.

At procedure 1540, the operating system version of the new unallocated host is updated to the baseline operating system version. In one embodiment, the baseline operating system version of the range of supported operating system versions is an oldest version of the range of supported operating system versions. FIGS. 13A through 13C depict flow diagrams 1300, 1350, and 1380, illustrating for methods for updating an operating system version of a host, according to various embodiments. At procedure 1550, the new unallocated host is released to the pool of unallocated hosts for allocation to a workload domain.

In one embodiment, as shown at procedure 1560, a command to add an unallocated host of the pool of unallocated hosts to a particular workload domain is received. At procedure 1570, an operating system version of hosts of the particular workload domain is determined. At procedure 1580, the operating system version of the unallocated host is updated to the operating system version of allocated hosts of the of the particular workload domain. FIGS. 13A through 13C depict flow diagrams 1300, 1350, and 1380, illustrating for methods for updating an operating system version of a host, according to various embodiments. At procedure 1590, the unallocated host is allocated to the particular workload domain.

It is noted that any of the procedures, stated above, regarding flow diagrams 1200 through 1500 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for managing hosts of a pre-configured hyper-converged computing device, the method comprising:
   managing a pre-configured hyper-converged computing device comprising a plurality of hosts, wherein the plurality of hosts is allocable to workload domains, wherein unallocated hosts of the plurality of hosts is maintained within a pool of unallocated hosts, and wherein the plurality of hosts each have an operating system version;
   determining that an unallocated host of the pool of unallocated hosts has an operating system version that is outside of a range of supported operating system versions; and
   updating the operating system version of the unallocated host to an operating system version within the range of supported operating system versions.

2. The computer-implemented method of claim 1, wherein the determining that the unallocated host of the pool of unallocated hosts has an operating system version that is outside of the range of supported operating system versions comprises:
   receiving an indication that the range of supported operating system versions does not support the operating system version of the unallocated host.

3. The computer-implemented method of claim 1, further comprising:
   responsive to a command to remove a host from a workload domain, adding the host to the pool of unallocated hosts.

4. The computer-implemented method of claim 3, wherein the determining that an unallocated host of the pool of unallocated hosts has an operating system version that is outside of the range of supported operating system versions comprises:
   comparing the operating system version of the unallocated host to the range of supported operating system versions; and
   provided that the unallocated host has an operating system version that is outside of the range of supported operating system versions, determining that the unallocated host has an operating system version that is outside of the range of supported operating system versions.

5. The computer-implemented method of claim 1, further comprising:
   responsive to an addition of a new host to the plurality of hosts of the pre-configured hyper-converged computing device, adding the new host to the pool of unallocated hosts.

6. The computer-implemented method of claim 5, wherein the determining that an unallocated host of the pool of unallocated hosts has an operating system version that is outside of the range of supported operating system versions comprises:
   comparing the operating system version of the new host to the range of supported operating system versions; and
   provided that the new host has an operating system version that is outside of the range of supported operating system versions, determining that the new host has an operating system version that is outside of the range of supported operating system versions.

7. The computer-implemented method of claim 1, wherein the determining that an unallocated host of the pool of unallocated hosts has an operating system version that is outside of the range of supported operating system versions comprises:
   scanning unallocated hosts of the pool of unallocated hosts to determine operating system versions of the unallocated hosts; and
   comparing the operating system versions of the unallocated hosts to the range of supported operating system versions.

8. The computer-implemented method of claim 1, wherein the updating the operating system version of the unallocated host to an operating system version within the range of supported operating system versions comprises:
   retrieving an operating system version from an operating system version repository; and
   applying the operating system version of the unallocated host to the operating system version retrieved from the operating system version repository.

9. The computer-implemented method of claim 1, further comprising:
   responsive to receiving a command to add a host to a workload domain, allocating the host to the workload domain and removing the host from the pool of unallocated hosts.

10. A non-transitory computer readable storage medium having computer readable program code stored thereon for causing a computer system to perform a method for managing hosts of a workload domain of a pre-configured hyper-converged computing device, the method comprising:
    managing a pre-configured hyper-converged computing device comprising a plurality of hosts, wherein the plurality of hosts is allocable to workload domains, wherein unallocated hosts of the plurality of hosts is maintained within a pool of unallocated hosts, and wherein the plurality of hosts each have an operating system version;

determining that an unallocated host of the pool of unallocated hosts has an operating system version that is outside of a range of supported operating system versions; and updating the operating system version of the unallocated host to an operating system version within the range of supported operating system versions.

11. The non-transitory computer readable storage medium of claim 10, wherein the determining that the unallocated host of the pool of unallocated hosts has an operating system version that is outside of the range of supported operating system versions comprises:

receiving an indication that the range of supported operating system versions does not support the operating system version of the unallocated host.

12. The non-transitory computer readable storage medium of claim 10, the method further comprising:

responsive to a command to remove a host from a workload domain, adding the host to the pool of unallocated hosts.

13. The non-transitory computer readable storage medium of claim 12, wherein the determining that an unallocated host of the pool of unallocated hosts has an operating system version that is outside of the range of supported operating system versions comprises:

comparing the operating system version of the unallocated host to the range of supported operating system versions; and provided that the unallocated host has an operating system version that is outside of the range of supported operating system versions, determining that the unallocated host has an operating system version that is outside of the range of supported operating system versions.

14. The non-transitory computer readable storage medium of claim 10, the method further comprising:

responsive to an addition of a new host to the plurality of hosts of the pre-configured hyper-converged computing device, adding the new host to the pool of unallocated hosts.

15. The non-transitory computer readable storage medium of claim 14, wherein the determining that an unallocated host of the pool of unallocated hosts has an operating system version that is outside of the range of supported operating system versions comprises:

comparing the operating system version of the new host to the range of supported operating system versions; and provided that the new host has an operating system version that is outside of the range of supported operating system versions, determining that the new host has an operating system version that is outside of the range of supported operating system versions.

16. The non-transitory computer readable storage medium of claim 10, wherein the determining that an unallocated host of the pool of unallocated hosts has an operating system version that is outside of the range of supported operating system versions comprises:

scanning unallocated hosts of the pool of unallocated hosts to determine operating system versions of the unallocated hosts; and comparing the operating system versions of the unallocated hosts to the range of supported operating system versions.

17. The non-transitory computer readable storage medium of claim 10, wherein the updating the operating system version of the unallocated host to an operating system version within the range of supported operating system versions comprises:

retrieving an operating system version from an operating system version repository; and applying the operating system version of the unallocated host to the operating system version retrieved from the operating system version repository.

18. The non-transitory computer readable storage medium of claim 10, the method further comprising:

responsive to receiving a command to add a host to a workload domain, allocating the host to the workload domain and removing the host from the pool of unallocated hosts.

19. A pre-configured hyper-converged computing device for supporting a virtualization infrastructure comprising:

a plurality of hosts, wherein each host of the plurality of hosts has an operating system version, wherein the plurality of hosts is allocable to workload domains, wherein unallocated hosts of the plurality of hosts is maintained within a pool of unallocated hosts, and wherein the plurality of hosts each have an operating system version; and a pre-configured software module supporting the virtualization infrastructure, the pre-configured software module is configured to:

manage the workload domains;

maintain a pool of unallocated hosts within the pre-configured hyper-converged computing device, wherein the unallocated hosts of the pool have operating system versions within a range of supported operating system versions;

determine that an unallocated host of the pool of unallocated hosts has an operating system version that is outside of a range of supported operating system versions; and update the operating system version of the unallocated host to an operating system version within the range of supported operating system versions.

20. The pre-configured hyper-converged computing device of claim 19, wherein the pre-configured software module is further configured to:

scan unallocated hosts of the pool of unallocated hosts to determine operating system versions of the unallocated hosts; and compare the operating system versions of the unallocated hosts to the range of supported operating system versions.

21. The pre-configured hyper-converged computing device of claim 19, wherein the pre-configured software module is further configured to:

retrieve an operating system version from an operating system version repository; and update the operating system version of the unallocated host to the operating system version retrieved from the operating system version repository.

* * * * *